United States Patent
Kanda et al.

(10) Patent No.: US 11,290,648 B2
(45) Date of Patent: Mar. 29, 2022

(54) IMAGE CAPTURE APPARATUS AND CONTROL METHOD THEREOF

(71) Applicant: CANON KABUSHIKI KAISHA, Tokyo (JP)

(72) Inventors: Akihiko Kanda, Kawasaki (JP); Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 16/683,377

(22) Filed: Nov. 14, 2019

(65) Prior Publication Data
US 2020/0162673 A1 May 21, 2020

(30) Foreign Application Priority Data
Nov. 16, 2018 (JP) .............................. JP2018-215780

(51) Int. Cl.
*H04N 5/232* (2006.01)
*G02B 7/28* (2021.01)
*H04N 5/225* (2006.01)

(52) U.S. Cl.
CPC ....... *H04N 5/23267* (2013.01); *H04N 5/2253* (2013.01); *H04N 5/2259* (2013.01); *H04N 5/2254* (2013.01)

(58) Field of Classification Search
CPC . H04N 5/232122; H04N 5/36961; G02B 7/28
USPC ....................................................... 348/345
See application file for complete search history.

(56) References Cited

U.S. PATENT DOCUMENTS

| | | | |
|---|---|---|---|
| 4,410,804 A | 10/1983 | Stauffer | |
| 10,244,158 B2 * | 3/2019 | Fujii | ................... H04N 5/3456 |
| 10,375,924 B2 * | 8/2019 | Betts-Lacroix | ........ A01K 1/031 |
| 10,812,704 B2 * | 10/2020 | Kikuchi | ............. H04N 5/23245 |

FOREIGN PATENT DOCUMENTS

JP      2001-083407 A      3/2001

* cited by examiner

*Primary Examiner* — Anthony J Daniels
(74) *Attorney, Agent, or Firm* — Cowan, Liebowitz & Latman, P.C.

(57) ABSTRACT

An image capture apparatus comprises an image sensor, from which a first viewpoint image and a second viewpoint image that share the same charge accumulation period can be read out. The apparatus further comprises a correction circuit that applies correction processing to the images read out from the image sensor. The apparatus controls the image sensor and the correction circuit so that correction processing performed on the first viewpoint image by the correction circuit during continuous shooting is performed in parallel with the readout of the first viewpoint image and the second viewpoint image from the image sensor.

14 Claims, 10 Drawing Sheets

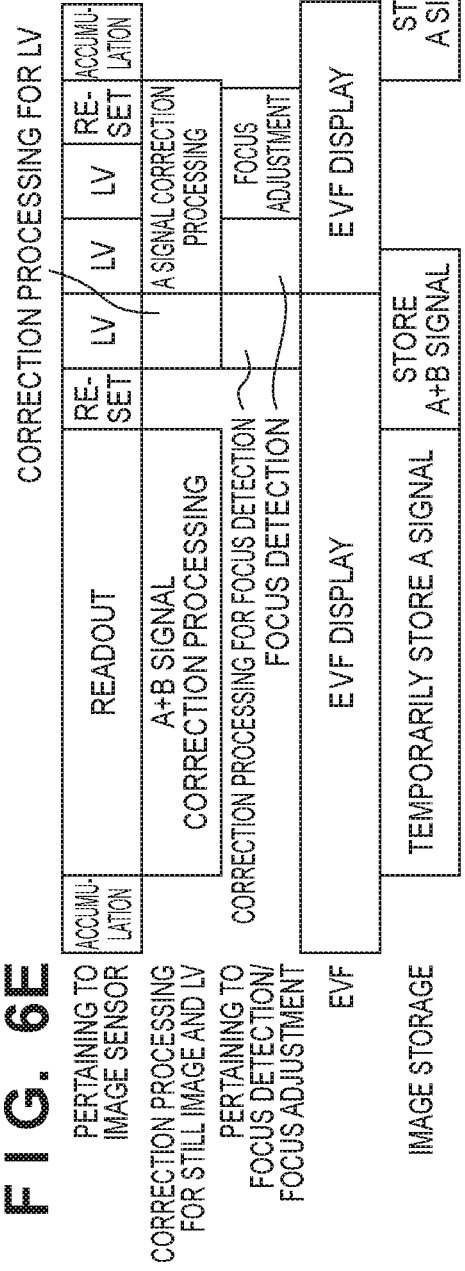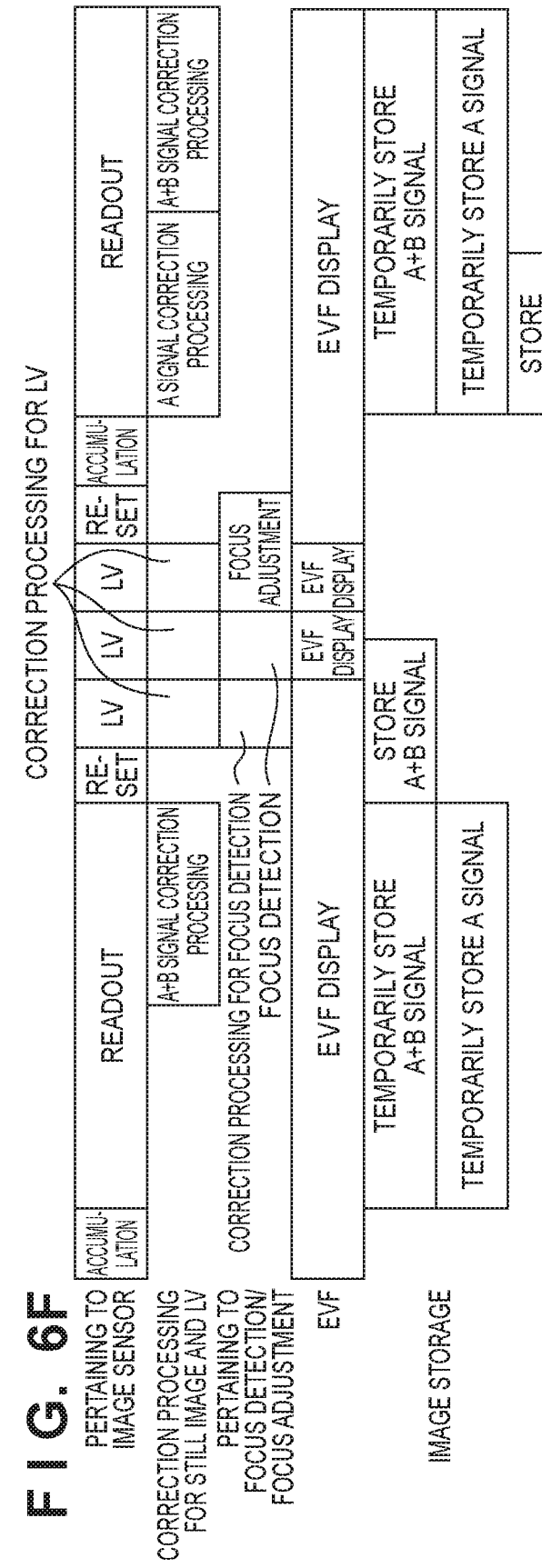

IMAGE CAPTURE APPARATUS AND CONTROL METHOD THEREOF

BACKGROUND OF THE INVENTION

Field of the Invention

The present invention relates to an image capture apparatus and a control method thereof.

Description of the Related Art

An image capture apparatus has been proposed in which the exit pupil of a shooting lens is divided into a plurality of pupil regions, and a plurality of viewpoint images respectively corresponding to the pupil regions can be captured simultaneously.

U.S. Pat. No. 4,410,804 discloses an image capture apparatus which uses an image sensor in which a pixel comprises a single microlens and a plurality of photoelectric conversion units. Of the exit pupils of the shooting lens, light emitted from mutually-different pupil regions enters respective ones of the plurality of photoelectric conversion units in each pixel. By reading out signals from each of the photoelectric conversion units and forming an image using the signals read out from the photoelectric conversion units at the same positions within the pixels, images having the same charge accumulation period can be from several different viewpoints (multi-viewpoint images) can be captured with a single shot. Furthermore, adding the signals obtained from the plurality of photoelectric conversion units on a pixel-by-pixel basis makes it possible to obtain a single image (a normal image) which is the same as an image obtained by a typical image sensor having a single microlens and a single photoelectric conversion unit per pixel (Japanese Patent Laid-Open No. 2001-083407).

In a case where multi-viewpoint images having the same charge accumulation periods are obtained and to be processed, the processing load is significantly heavier than in a case where a single image is obtained and to be processed. It may cause a continuous shooting speed to be slower in, for example, a shooting mode which obtains multi-viewpoint images than in a shooting mode which obtains a normal image.

SUMMARY OF THE INVENTION

The present invention provides an image capture apparatus and a control method thereof that can suppress a drop in continuous shooting speed when obtaining multi-viewpoint images having the same charge accumulation periods.

According to an aspect of the present invention, there is provided an image capture apparatus comprising: an image sensor, from which a first viewpoint image and a second viewpoint image that share the same charge accumulation period can be read out; a correction circuit that applies correction processing to the images read out from the image sensor; and one or more processors that execute a program stored in a memory and function as: a control unit configured to control the image sensor and the correction circuit so that correction processing performed on the first viewpoint image by the correction circuit during continuous shooting is performed in parallel with the readout of the first viewpoint image and the second viewpoint image from the image sensor.

According to another aspect of the present invention, there is provided a method of controlling an image capture apparatus, the apparatus including an image sensor, from which a first viewpoint image and a second viewpoint image that share the same charge accumulation periods can be read out, and a correction circuit that applies correction processing to the images read out from the image sensor, the method comprising: controlling the image sensor and the correction circuit so that correction processing performed on the first viewpoint image by the correction circuit during continuous shooting is performed in parallel with the readout of the first viewpoint image and the second viewpoint image from the image sensor.

According to a further aspect of the present invention, there is provided a non-transitory computer-readable medium storing a program for causing a computer, the computer including an image capture apparatus having an image sensor, from which a first viewpoint image and a second viewpoint image that share the same charge accumulation periods can be read out, and a correction circuit that applies correction processing to the images read out from the image sensor, to function as a control unit configured to control the image sensor and the correction circuit so that correction processing performed on the first viewpoint image by the correction circuit during continuous shooting is performed in parallel with the readout of the first viewpoint image and the second viewpoint image from the image sensor.

Further features of the present invention will become apparent from the following description of exemplary embodiments with reference to the attached drawings.

BRIEF DESCRIPTION OF THE DRAWINGS

FIGS. 6A to 6F are diagrams illustrating an example of a processing sequence carried out during continuous shooting.

DESCRIPTION OF THE EMBODIMENTS

An exemplary embodiment of the present invention will now be described in detail in accordance with the accompanying drawings. An embodiment in which a focus detection device according to the present invention is applied in an interchangeable lens-type digital single-lens reflex camera (camera system) will be described here. However, the focus detection device according to the present invention can be applied in any electronic device having an image sensor capable of generating signals used in phase difference-based focus detection. Such an electronic device of course includes cameras in general, such as digital still cameras and digital video cameras, but also includes mobile phones, computer devices, media players, robot devices, game consoles, household electronics, and the like having camera functions. The electronic device is not limited to these, however.

Figure 1A:
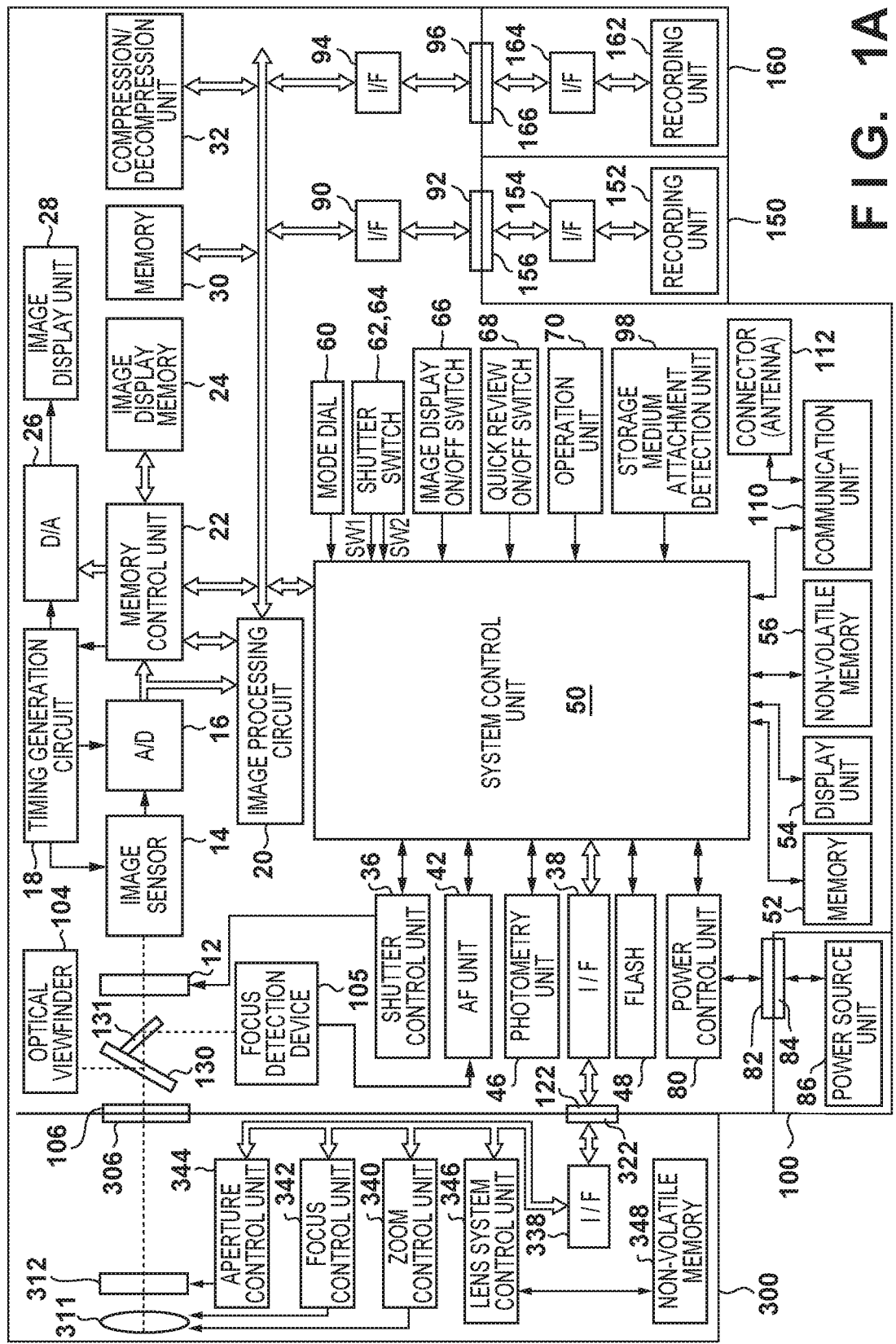
FIG. 1A is a block diagram illustrating an example of the functional configuration of a camera system serving as an example of an image capture apparatus including a focus detection device according to an embodiment.

FIG. 1A is a diagram illustrating an example of the configuration of a camera system constituted by an interchangeable lens-type camera and a shooting lens, the system serving as an example of an image capture apparatus including the focus detection device according to an embodiment of the present invention. As illustrated in FIG. 1A, the camera system is constituted by a camera 100 and an interchangeable shooting lens 300.

Light beams passing through the shooting lens 300 enter the camera 100 through lens mounts 306 and 106. The light that has entered the camera 100 is reflected upward by a main mirror 130 to be incident on an optical viewfinder 104. Using the optical viewfinder 104, the shooter can shoot an image while viewing an optical image of a subject. A display unit that provides, for example, a focus indicator, a hand shake warning indicator, an aperture value indicator, an exposure correction indicator, and the like along with the subject optical image is provided in the optical viewfinder 104.

A sub mirror 131 is provided on the rear surface of the main mirror 130. Part of the main mirror 130 is a half mirror so that some of the light incident on the main mirror 130 is also incident on the sub mirror 131. The light that has passed through the main mirror 130 is reflected downward by the sub mirror 131 and enters a focus detection device 105. The focus detection device 105 is, for example, a phase difference detection-based focus detection device having a secondary image forming optical system and a line sensor, and outputs a pair of image signals to an AF unit (autofocus unit) 42. The AF unit 42 carries out phase difference detection computations on the pair of image signals to find a defocus amount and defocus direction of the shooting lens 300 on the basis of the detected phase difference. A system control unit 50 controls a focus control unit 342 (mentioned later) of the shooting lens 300 to drive a focus lens of the shooting lens 300 to a position based on the defocus amount and defocus direction found by the AF unit 42.

When an image is shot by exposing an image sensor 14, the system control unit 50 uses a quick-return mechanism (not shown) to retract the main mirror 130 and the sub mirror 131 from the optical path (mirror-up). As a result, the light entering the camera 100 through the shooting lens 300 can be incident on the image sensor 14 through an opening in a shutter 12. When the shooting by the image sensor 14 is complete, the system control unit 50 returns the main mirror 130 and the sub mirror 131 to the position illustrated in FIG. 1A (i.e., in the optical path). Note that the shooting by the image sensor 14 includes shooting a moving image for displaying a live view image in an image display unit 28 (described later), shooting a moving image for recording, and the like, in addition to shooting a still image.

The image sensor 14 is a CCD or a CMOS image sensor, and is configured with a plurality of pixels, each having a photoelectric conversion region (or photodiode), arranged two-dimensionally. Each pixel outputs an electrical signal having a voltage corresponding to an amount of incident light. The image sensor 14 thus converts the subject optical image into a collection of electrical signals. The individual electrical signals read out from the image sensor 14 are converted into digital signals (image data) by an A/D converter 16. As will be described later, the A/D converter 16 may be incorporated into the image sensor 14.

At least some of the pixels in the image sensor 14 according to the present embodiment are configured to have a plurality of photoelectric conversion regions (or photodiodes). As described above, a pixel having such a configuration can output signals used in phase difference-based focus detection. This means that phase difference-based focus detection can be carried out using the output of the image sensor 14, even when the quick return mechanism has retracted the main mirror 130 and the sub mirror 131 from the optical path and light is not incident on the focus detection device 105.

In the present embodiment, it is assumed that a single pixel includes two photoelectric conversion regions. In this case, three types of outputs can be obtained from a pixel having a plurality of photoelectric conversion units; the output from the first photoelectric conversion unit (an A signal); the output from the second photoelectric conversion unit (a B signal), and the combined output from the first photoelectric conversion unit and the second photoelectric conversion unit (an A+B signal). If the plurality of photoelectric conversion regions can be handled as being divided in half in a predetermined direction (e.g., the horizontal or vertical direction), the number of photoelectric conversion regions in a single pixel need not be two. The A signal may also be obtained by subtracting the B signal from the A+B signal. Likewise, the B signal may be obtained by subtracting the A signal from the A+B signal.

A timing generation circuit 18 supplies clock signals, control signals, and the like to the image sensor 14, the A/D converter 16, and a D/A converter 26. The operation of the timing generation circuit 18 is controlled by a memory control unit 22 and the system control unit 50. Control signals for reading out the output from some of the photoelectric conversion units in the pixels having a plurality of photoelectric conversion units, reading out the combined output of all the photoelectric conversion units, and the like are supplied to the image sensor 14 by the system control unit 50 controlling the timing generation circuit 18.

An image processing circuit 20 applies image processing to image data from the A/D converter 16 or image data from the memory control unit 22. The image processing circuit 20 can be realized as a hardware circuit such as a digital signal processor (DSP), an ASIC, an FPGA, a CPLD, or the like, for example. The image processing circuit 20 can also be replaced with a programmable processor and memory, wherein the programmable processor embodies the functions of the image processing circuit 20 by executing programs stored in the memory.

Figure 1B:
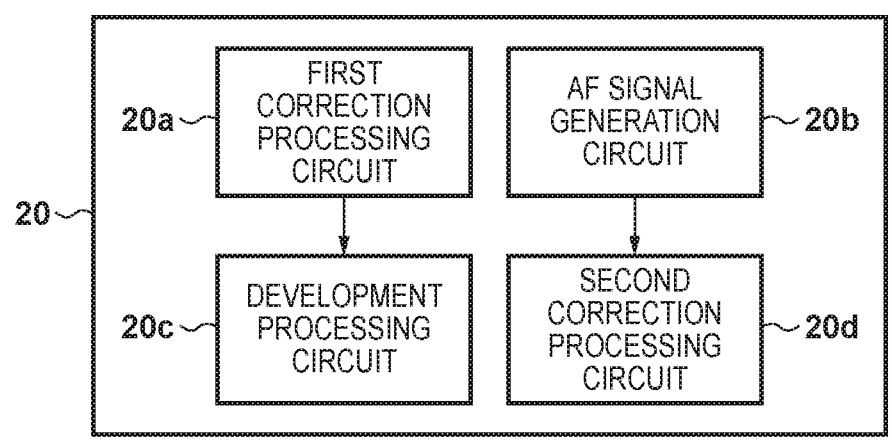
FIG. 1B is a block diagram illustrating an example of the configuration of an image processing circuit and memory illustrated in FIG. 1A.
Figure 1B:
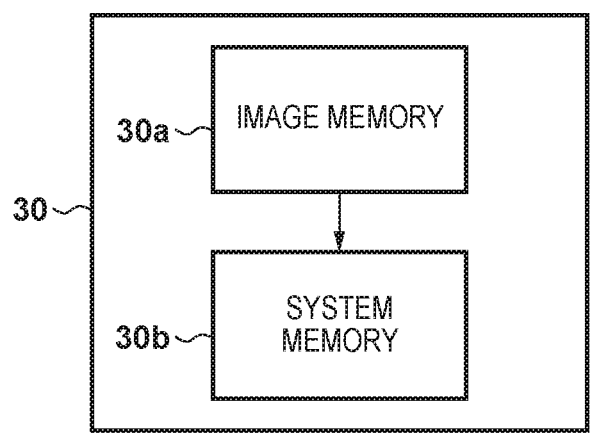

FIG. 1B is a diagram schematically illustrating some of the functions realized by the image processing circuit 20 as blocks. A first correction processing circuit 20a and a second correction processing circuit 20d each applies a predetermined correction process. Here, the first correction processing circuit 20a provides its correction process for image data to be used for display and recording, while the second correction processing circuit 20d provides its correction process for image data to be used for focus detection.

The image data for focus detection is generated from some of the pixels, and thus has a lower data amount than the image data used for display and recording. Furthermore, no color information is needed for focus detection, and thus only luminance information is needed. Accordingly, if the first and second correction processing circuits 20a and 20d are realized by hardware circuits, the second correction processing circuit 20d may have a smaller circuit scale than the first correction processing circuit 20a. A development processing circuit 20c applies development processing (pixel interpolation, white balance adjustment, color conversion, and the like) to the image data already subjected to the correction processing by the first correction processing circuit 20a.

An AF signal generation circuit 20b generates a pair of signal strings to be used in phase difference-based focus detection from the output signals (the aforementioned A and B signals) which, of the image data from the A/D converter 16 (the output signals from the image sensor 14), are used to generate focus detection signals. For example, the AF signal generation circuit 20b generates an A image from a signal string constituted by a plurality of A signals read out from a plurality of pixels arranged in a division direction of the photoelectric conversion units (the horizontal direction, in the examples of FIGS. 2A and 2B) included in a focus detection region. In the same manner, the AF signal generation circuit 20b generates a B image from a signal string constituted by a plurality of B signals. The A and B images are the pair of signal strings used in the phase difference-based focus detection. Note that the method for generating the pair of signal strings used in the phase difference-based focus detection from the A and B signals is not limited to this method.

The second correction processing circuit 20d applies its correction process to the pair of signal strings generated by the AF signal generation circuit 20b. The pair of signal strings is then sent to the AF unit 42 via the system control unit 50. The AF unit 42 uses a correlation computation on the pair of signal strings to detect a skew amount (shift amount) between the signal strings, and converts the skew amount into a defocus amount and defocus direction of the shooting lens 300. The AF unit 42 outputs the defocus amount and direction obtained from the conversion to the system control unit 50. The system control unit 50 then drives the focus lens through the focus control unit 342 of the shooting lens 300 to adjust the focal distance of the shooting lens 300.

The AF signal generation circuit 20b of the image processing circuit 20 can also compute a contrast evaluation value on the basis of the signal for generating the normal image data serving as a first viewpoint image (this signal corresponds to the aforementioned A+B signal), which is obtained from the image sensor 14. The contrast evaluation value may be output directly to the system control unit 50 from the AF signal generation circuit 20b. The system control unit 50 shoots an image using the image sensor 14 while varying the focus lens position using the focus control unit 342 of the shooting lens 300, and finds changes in the contrast evaluation value calculated by the image processing circuit 20. The system control unit 50 then drives the focus lens to the position where the contrast evaluation value is the highest. In this manner, the camera 100 according to the present embodiment can also carry out contrast detection-based focus detection.

Accordingly, even if the main mirror 130 and the sub mirror 131 have been retracted from the optical path and light is not incident on the focus detection device 105, as is the case when shooting a moving image, the camera 100 can carry out focus detection on the basis of the signal obtained from the image sensor 14. In this case, the system control unit 50 can use the phase difference detection method, the contrast detection method, or both. Furthermore, when shooting a still image using the optical viewfinder 104, during which the main mirror 130 and the sub mirror 131 are inside the optical path, the camera 100 can carry out phase difference-based focus detection using the focus detection device 105. In other words, the camera 100 can detect the focus no matter the state, i.e., when shooting a still image, when displaying a live view, when shooting a moving image (to be recorded), and so on.

The memory control unit 22 controls the A/D converter 16, the timing generation circuit 18, the image processing circuit 20, image display memory 24, the D/A converter 26, memory 30, and a compression/decompression unit 32. The image data output by the A/D converter 16 is written into the image display memory 24 or the memory 30 via the image processing circuit 20 and the memory control unit 22, or via the memory control unit 22 alone. Image data for display, which is adapted to the characteristics of the image display unit 28, for example, is written into the image display memory 24. The image data for display is converted into an analog signal for display by the D/A converter 26, and the analog signal is then output to the image display unit 28. The image display unit 28 is a liquid crystal display, for example. The image display unit 28 can be caused to function as an electronic viewfinder (EVF) by displaying the image data for display, which has been generated from a moving image shot by the image sensor 14, in sequence in the image display unit 28. The display operations for causing the image display unit 28 to function as an EVF are called "live view display", and the image displayed is called a "live view image". The image display unit 28 has a function for turning the display on and off in response to instructions from the system control unit 50. The power consumed by the camera 100 can be reduced by turning the display off.

The memory 30 is DRAM, for example, and is constituted by image memory 30a and system memory 30b, as illustrated in FIG. 1B. Note that the image memory 30a and the system memory 30b may be different regions in the same memory space. The image memory 30a is used for the temporary storage of still images, moving images, and the like, and has a storage capacity sufficient for storing a predetermined number of still images, a predetermined time's worth of moving images, and so on. The image memory 30a is used as an image buffer during continuous shooting, panoramic shooting, and so on, for example. The system memory 30b is used for the system control unit 50 to execute programs stored in non-volatile memory 52, to temporary store signals obtained from the image sensor 14, and so on.

The compression/decompression unit 32 loads image data stored in the image memory 30a and applies an adaptive discrete cosine transform (ADCT) or the inverse transform thereof, for example, to compress (encode) or decompress (decode) the image data. The compression/decompression unit 32 writes the processed image data back into the image memory 30a. Note that the compression and decompression methods can be different depending on the settings.

A shutter control unit 36 controls the operations of the shutter 12 under the control of the system control unit 50, in tandem with an aperture control unit 344, which controls an aperture stop 312 of the shooting lens 300. An interface (I/F) unit 38 and a connector 122 electrically connect the shooting lens 300 to the camera 100. The I/F unit 38 and the connector 122 provide a communication path for control signals, status signals, data, and the like between the camera 100 and the shooting lens 300, as well as a power supply path from the camera 100 to the shooting lens 300. Note that the I/F unit 38 and the connector 122 may have a configuration for transmitting optical signals.

A photometry unit 46 can obtain luminance information of the subject optical image and carry out automatic exposure control (AE) processing for determining exposure conditions using a program chart or the like, which associates subject luminances with exposure conditions. The photometry unit 46 can obtain the luminance information of the subject optical image by, for example, measuring the luminance of the subject optical image entering the optical viewfinder 104 using an image sensor, for example. The photometry unit 46 also realizes a light adjustment function by operating in tandem with a flash 48. Note that the system control unit 50 may execute the AE process and determine the exposure conditions on the basis of luminance information or the like obtained from the image data which has been obtained by the image processing circuit 20 from the image sensor 14. In either case, the system control unit 50 controls the shutter control unit 36 and the aperture control unit 344 of the shooting lens 300 on the basis of the determined exposure conditions. The flash 48 has a function for producing AF assist light, determining the flash strength when shooting, and so on.

The system control unit 50 includes a processor such as a CPU or an MPU. The operations of the camera system as a whole are controlled by the processor loading programs, which are stored in advance in the non-volatile memory 52, for example, into the system memory 30b and executing the programs. The non-volatile memory 52 stores constants, variables, programs, and the like used for the operations of the system control unit 50.

A display unit 54 is, for example, a liquid-crystal display device that displays operation statuses, messages, and the like using text, images, audio, and so on, in response to programs being executed by the system control unit 50. One or more of the display unit 54 are arranged in easily-visible positions, near an operation unit of the camera 100, and are constituted by a combination of an LCD, LEDs, and the like, for example. Of the content displayed in the display unit 54, information pertaining to numbers of shots, such as the number of shots recorded and the remaining number of shots that can be taken, information pertaining to shooting conditions such as the shutter speed, aperture value, exposure correction, and flash, and the like are displayed in the LCD or the like. The remaining battery power, the date and time, and the like are also displayed.

Non-volatile memory 56 is electrically erasable/recordable memory, e.g., EEPROM. 60, 62, 64, 66, 68, and 70 are operation units for entering various types of operational instructions to the system control unit 50, and are constituted by one or a combination of multiple switches and dials, a touch panel, a pointing system using line-of-sight detection, a voice recognition apparatus, and the like.

A mode dial 60 can switch among and set various function modes, such as power off, an auto shooting mode, a manual shooting mode, a playback mode, a PC connection mode, and the like. 62, which is a shutter switch SW1, turns on when a shutter button (not shown) is pressed halfway. This instructs processes such as AF, AE, AWB, and EF to start. 64, which is a shutter switch SW2, turns on when the shutter button is fully pressed. This instructs a series of processes pertaining to shooting to start. The series of processes pertaining to shooting includes exposure, development, recording, and the like. In the exposure process, a signal read out from the image sensor 14 is passed through the A/D converter 16 and the memory control unit 22, and the resulting image data is written into the memory 30. In the development process, the correction process by the first correction processing circuit 20a, the development process by the development processing circuit 20c, and the like are carried out. In the recording process, the image data is read out from the image memory 30a, compressed by the compression/decompression unit 32, and written into a storage medium 150 or 160 as image data.

An image display on/off switch 66 can turn the image display unit 28 on or off. This function makes it possible to save power, by cutting off the supply of current to the image display unit 28, which is constituted by a liquid-crystal monitor or the like, when images are shot using the optical viewfinder 104. A quick review on/off switch 68 configures a quick view function for automatically playing back image data that has been shot, immediately after the shooting. An operation unit 70 is constituted by various buttons, a touch panel, and so on. The various buttons include a menu button, a flash setting button, a single/continuous/self-timer switching button, an exposure correction button, and the like.

A power control unit 80 is constituted by a battery detection circuit, a DC-DC converter, switch circuits for switching the blocks that are electrified, and so on. Whether or not a battery is attached, the type of the battery, and the remaining battery power are detected, and the DC-DC converter is controlled on the basis of the detection results and instructions from the system control unit 50 to supply power to the various units, including the storage media, at the necessary voltage and for the necessary time. Connectors 82 and 84 connect a power source unit 86, which is a primary battery such as an alkali battery or a lithium battery, a secondary battery such as a NiCd battery, a NiMH battery, or a lithium-ion battery, an AC adapter, or the like to the camera 100.

Interface (I/F) units 90 and 94 have functions for connecting to storage media such as memory cards or hard disks, and connectors 92 and 96 make physical contact with the terminals of the storage media 150 and 160, which are memory cards, hard disks, or the like. A medium attachment detection unit 98 detects whether or not a storage medium is attached to the connector 92 or 96. Although the present embodiment describes two combinations of interfaces and connectors for attaching the storage media, the configuration may employ any numbers of interfaces and connectors and combinations thereof. The configuration may furthermore provide combinations of interfaces and connectors of differing standards. Furthermore, by connecting various types of communication cards, such as a LAN card, to the interfaces and connectors, image data, management information attached to the image data, and the like can be exchanged with computers, other peripheral devices such as printers, and the like.

A communication unit 110 has various communication functions, such as wired communication and wireless communication. A connector 112 connects the camera 100 to another device using the communication unit 110. In the case of wireless communication, the connector 112 is an antenna. The storage media 150 and 160 are memory cards, hard disks, or the like. The storage media 150 and 160 include recording units 152 and 162, which are constituted by semiconductor memory, magnetic disks, or the like; interfaces 154 and 164 with the camera 100; and connectors 156 and 166 for connecting to the camera 100.

The shooting lens 300 will be described next. The shooting lens 300 is mechanically and electrically connected to the camera 10) by engaging a lens mount 306 with a lens mount 106 of the camera 100. The electrical connection is realized by the connector 122 and a connector 322 provided in the lens mount 106 and the lens mount 306, respectively. A lens 311 includes a focus lens for adjusting the focal distance of the shooting lens 300. The focus control unit 342 adjusts the focus of the shooting lens 300 by driving the focus lens along the optical axis. The operations of the focus control unit 342 are controlled by the system control unit 50, which functions as adjustment means, through a lens system control unit 346. The aperture stop 312 adjusts the amount and angle of subject light entering the camera 100.

The connector 322 and an interface 338 electrically connect the shooting lens 300 to the connector 122 of the camera 100. The connector 322 also has a function for transferring control signals, status signals, data signals, and the like between the camera 100 and the shooting lens 300, as well as supplying current at various voltages. The connector 322 may be configured to carry out optical communication, audio communication, and the like in addition to electrical communication.

A zoom control unit 340 drives a magnification lens in the lens 311 to adjust the focal length (angle of view) of the shooting lens 300. If the shooting lens 300 is a fixed-focus lens, the zoom control unit 340 is not included. The aperture control unit 344 controls the aperture stop 312 on the basis of photometry information from the photometry unit 46, in tandem with the shutter control unit 36, which controls the shutter 12.

The lens system control unit 346 includes a programmable processor such as a CPU or an MPU, for example, and controls the operations of the shooting lens 300 as a whole by executing programs that have been stored in advance. The lens system control unit 346 has a memory function for storing constants, variables, programs, and the like for the operations of the shooting lens. Non-volatile memory 348 stores identification information such as a unique number of the shooting lens, management information, functional information such as maximum and minimum aperture values and focal lengths, current and past setting values, and the like.

The non-volatile memory 348 also stores lens frame information based on the state of the shooting lens 300. The lens frame information is information of the radius of the opening in the lens frame, which determines the light that enters the camera 100 through the shooting lens 300, and information of the distance from the image sensor 14 to the opening in the lens frame. The lens frame includes the aperture stop 312 in addition to frame-shaped components that hold edge parts of the lens 311. The position and/or opening radius of the lens frame vary depending on the focal distance of the lens 311 (the position of the focus lens), the focal length (zoom position), and so on. As such, multiple instances of the lens frame information are stored, corresponding to multiple focus positions, zoom positions, and so on of the lens 311. When the camera 100 detects the focus, the lens frame information corresponding to the focus position and zoom position of the lens 311 is read out from the non-volatile memory 348 and supplies to the camera 100 (the system control unit 50) through the connectors 322 and 122.

The foregoing has described the camera system, constituted by the camera 100 and the shooting lens 30X), according to the present embodiment.

Figure 2A:
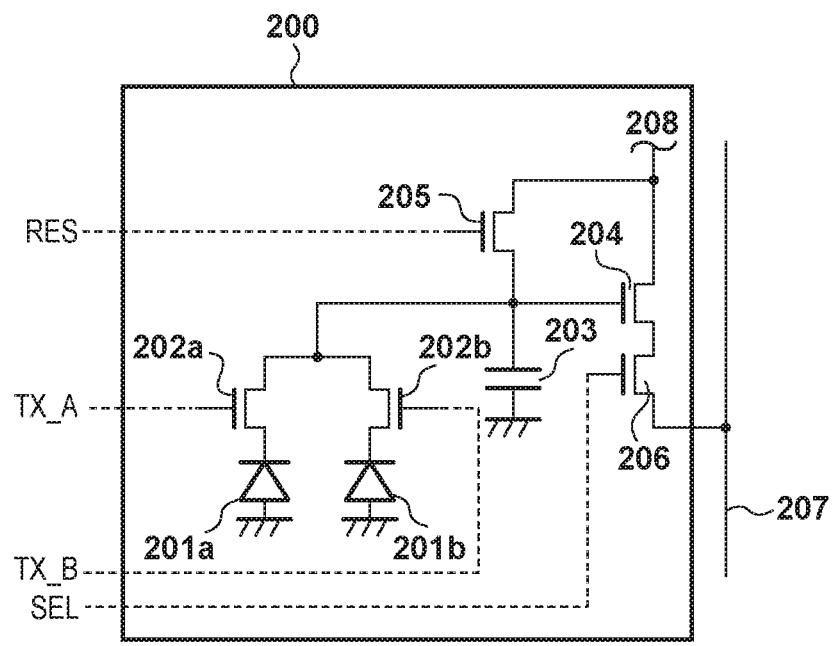
FIGS. 2A and 2B are diagrams illustrating an example of the configuration of an image sensor according to an embodiment.

The configuration of the image sensor 14 will be described next with reference to FIGS. 2A to 3. FIG. 2A illustrates an example of the circuit configuration of a pixel, among the plurality of pixels provided in the image sensor 14, which is configured to be capable of outputting signals used in phase difference-based focus detection. The following will describe a configuration in which a single pixel 200 is provided with two photodiodes (PDs) 201a and 201b, which serve as a plurality of photoelectric conversion regions or photoelectric conversion units sharing a microlens. However, more photodiodes (e.g., four) may be provided instead. The photodiode 201a (the first photoelectric conversion unit) and the photodiode 201b (a second photoelectric conversion unit) function both as focus detection pixels and as image capturing pixels, as will be described later.

Transfer switches 202a and 202b, a reset switch 205, and a selection switch 206 may be constituted by MOS transistors, for example. Although the following will describe these switches as N-type MOS transistors, the switches may instead be P-type MOS transistors or another type of switching element.

Figure 2B:
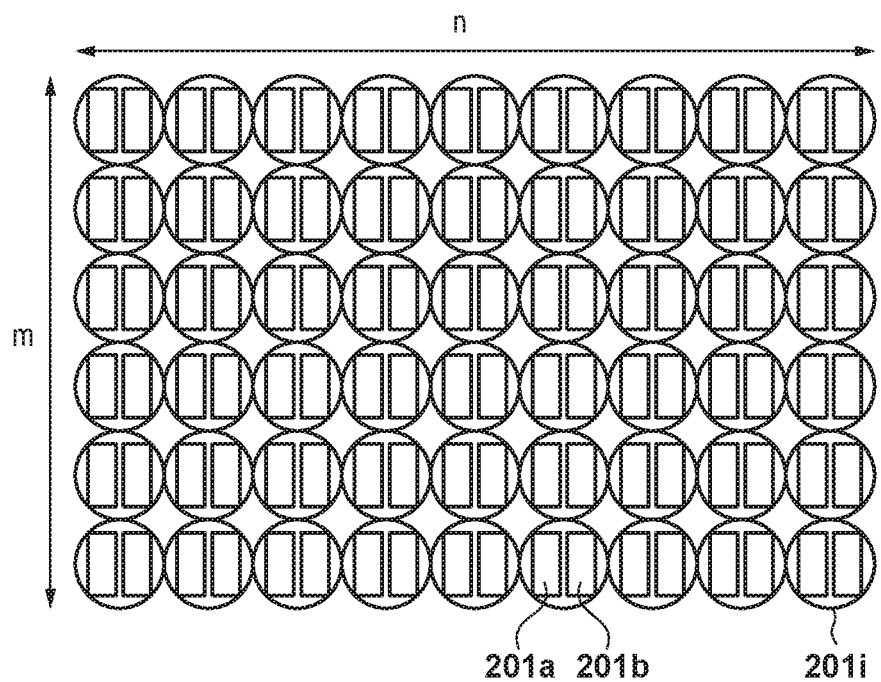

FIG. 2B is a diagram schematically illustrating n horizontal pixels and m vertical pixels, among the plurality of pixels arranged two-dimensionally in the image sensor 14. It is assumed here that all of the pixels have the configuration illustrated in FIG. 2A. Each pixel is provided with a microlens 201i, and the photodiodes 201a and 201b share the same microlens. In the following, a signal obtained by the photodiode 201a will be called the "A signal" or a "first signal", and a signal obtained by the photodiode 201b will be called the "B signal" or a "second signal". Likewise, a signal string for focus detection generated from a plurality of the A signals will be called the "A image" or a "first image signal", and a signal string for focus detection generated from a plurality of the B signals will be called the "B image" or a "second image signal". A pair of images constituted by an A image and a B image will be called a "signal string pair" or an "image signal pair".

The transfer switch 202a is connected between the photodiode 201a and a floating diffusion (FD) 203. The transfer switch 202b is connected between the photodiode 201b and the FD 203. The transfer switches 202a and 202b are elements that transfer the charges produced by the photodiodes 201a and 201 b to the common FD 203. The transfer switches 202a and 202b are controlled by control signals TX_A and TX_B, respectively.

The floating diffusion (FD) 203 temporarily holds the charges transferred from the photodiodes 201a and 201b, and functions as a charge-voltage conversion unit (capacitor) that converts the held charge into a voltage signal.

An amplifying unit 204 is a source-follower MOS transistor. The gate of the amplifying unit 204 is connected to the FD 203, and the drain of the amplifying unit 204 is connected to a power source 208 which supplies a source potential VDD. The amplifying unit 204 amplifies the voltage signal based on the charge held in the FD 203 and outputs the amplified signal as an image signal.

The reset switch 205 is connected between the FD 203 and the power source 208. The reset switch 205 is controlled by a control signal RES, and has a function for resetting the potential at the FD 203 to the source potential VDD.

The selection switch 206 is connected between the source of the amplifying unit 204 and a vertical output line 207. The selection switch 206 is controlled by a control signal SEL, and outputs the image signal amplified by the amplifying unit 204 to the vertical output line 207.

Figure 3:
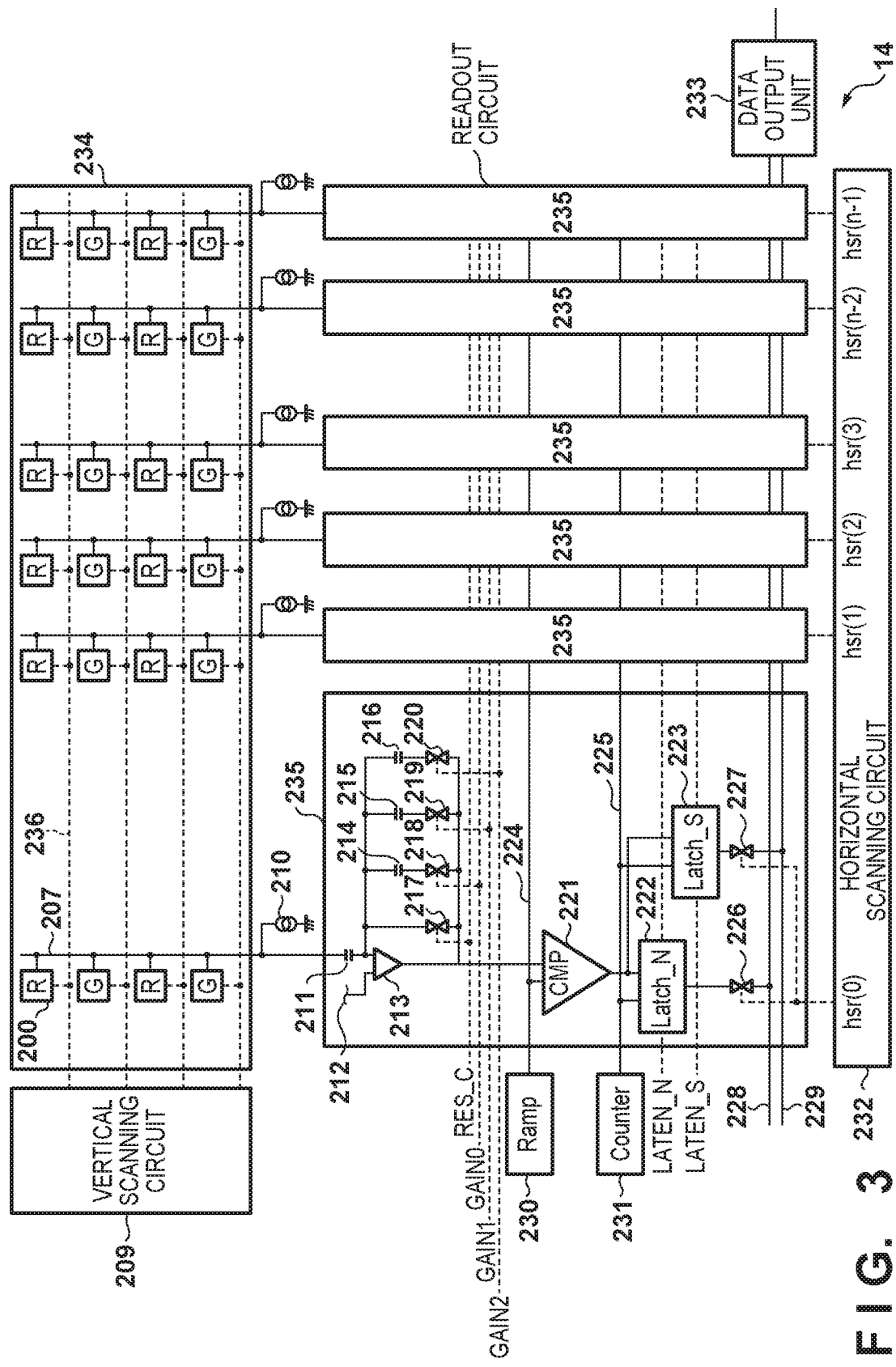
FIG. 3 is a diagram illustrating an example of the configuration of an image sensor according to an embodiment.

FIG. 3 is a diagram illustrating an example of the configuration of the image sensor 14. The image sensor 14 includes a pixel array 234, a vertical scanning circuit 209, a current source load 210, readout circuits 235, common output lines 228 and 229, a horizontal scanning circuit 232, and a data output unit 233. It is assumed that all of the pixels in the pixel array 234 have the circuit configuration illustrated in FIG. 2A. However, some of the pixels may be configured with only one photodiode provided for each microlens.

The pixel array 234 includes a plurality of the pixels 200 arranged in a matrix. For the sake of simplicity, FIG. 3 illustrates the pixel array 234 as having four rows and n columns. However, the pixels 200 included in the pixel array 234 may have any number of rows and any number of columns. Furthermore, in the present embodiment, the image sensor 14 is a single-panel color image sensor having color filters in a primary-color Bayer pattern. As such, each pixel 200 is provided with one of a red (R), green (G), and blue (B) color filter. Note that the colors and arrangement of the color filters are not particularly limited. Some of the pixels in the pixel array 234 are blocked from light to form an optical black (OB) region.

The vertical scanning circuit 209 supplies the various control signals illustrated in FIG. 2A to each row of the pixels 200 via drive signal lines 236 provided on a row-by-row basis. Although FIG. 3 illustrates only one drive signal line 236 in each row for the sake of simplicity, a plurality of drive signal lines are actually present in each row.

The pixels included in the pixel array 234 are connected to a common vertical output line 207 on a column-by-column basis. The current source load 210 is connected to each vertical output line 207. The signal from each pixel 200 is input to the readout circuit 235 provided for that column via the vertical output line 207.

The horizontal scanning circuit 232 outputs control signals hsr(0) to hsr(n−1), each of which corresponds to a single readout circuit 235. The control signals hsr( ) select one of the n readout circuits 235. The readout circuit 235 selected by the control signals hsr( ) outputs a signal to the data output unit 233 through the common output lines 228 and 229.

An example of the circuit configuration of the readout circuits 235 will be described in detail next. Although FIG. 3 illustrates an example of the circuit configuration for one of the n readout circuits 235, the other readout circuits 235 have the same configuration. The readout circuit 235 according to the present embodiment includes a ramp-type AD converter.

The signal input to the readout circuit 235 through the vertical output line 207 is input to an inverting input terminal of an op-amp 213 via a clamp capacitance 211. A reference voltage Vref is supplied to a non-inverting input terminal of the op-amp 213 from a reference voltage source 212. Feedback capacitances 214 to 216 and switches 218 to 220 are connected between the inverting input terminal and an output terminal of the op-amp 213. A switch 217 is furthermore connected between the inverting input terminal and the output terminal of the op-amp 213. The switch 217 is controlled by a control signal RES_C, and has a function for shorting both ends of the feedback capacitances 214 to 216. The switches 218 to 220 are controlled by control signals GAIN0 to GAIN2 from the system control unit 50.

An output signal from the op-amp 213, and a ramp signal 224 output from a ramp signal generator 230, are input to a comparator 221. Latch_N 222 is a storage element for holding a noise level (N signal), whereas Latch_S 223 is a storage element for holding the A signal, and a signal level obtained by adding the A signal and the B signal (the A+B signal). The output of the comparator 221 (a value expressing the comparison result) and the output 225 of a counter 231 (a counter value) are input to the Latch_N 222 and the Latch_S 223, respectively. The operations of the Latch_N 222 and the Latch_S 223 (active or inactive) are controlled by LATEN_N and LATEN_S, respectively. The noise level held by Latch_N 222 is output to the common output line 228 via a switch 226. The signal level held by Latch_S 223 is output to the common output line 229 via a switch 227. The common output lines 228 and 229 are connected to the data output unit 233.

The switches 226 and 227 are controlled by a control signal hsr(h) from the horizontal scanning circuit 232. Here, h represents the column number of the readout circuit 235 to which the control signal line is connected. The signal levels held in Latch_N 222 and Latch_S 223 of each readout circuit 235 are output sequentially to the common output lines 228 and 229, and are output to the memory control unit 22, the image processing circuit 20, and the like through the data output unit 233. The operation of sequentially outputting the signal levels held in each readout circuit 235 to the exterior is called "horizontal transfer". Note that the control signals input to the readout circuits (with the exception of hsr( )), the control signals for the vertical scanning circuit 209, the horizontal scanning circuit 232, the ramp signal generator 230, and the counter 231, and so on are supplied from the timing generation circuit 18, the system control unit 50, and the like.

Figure 4:
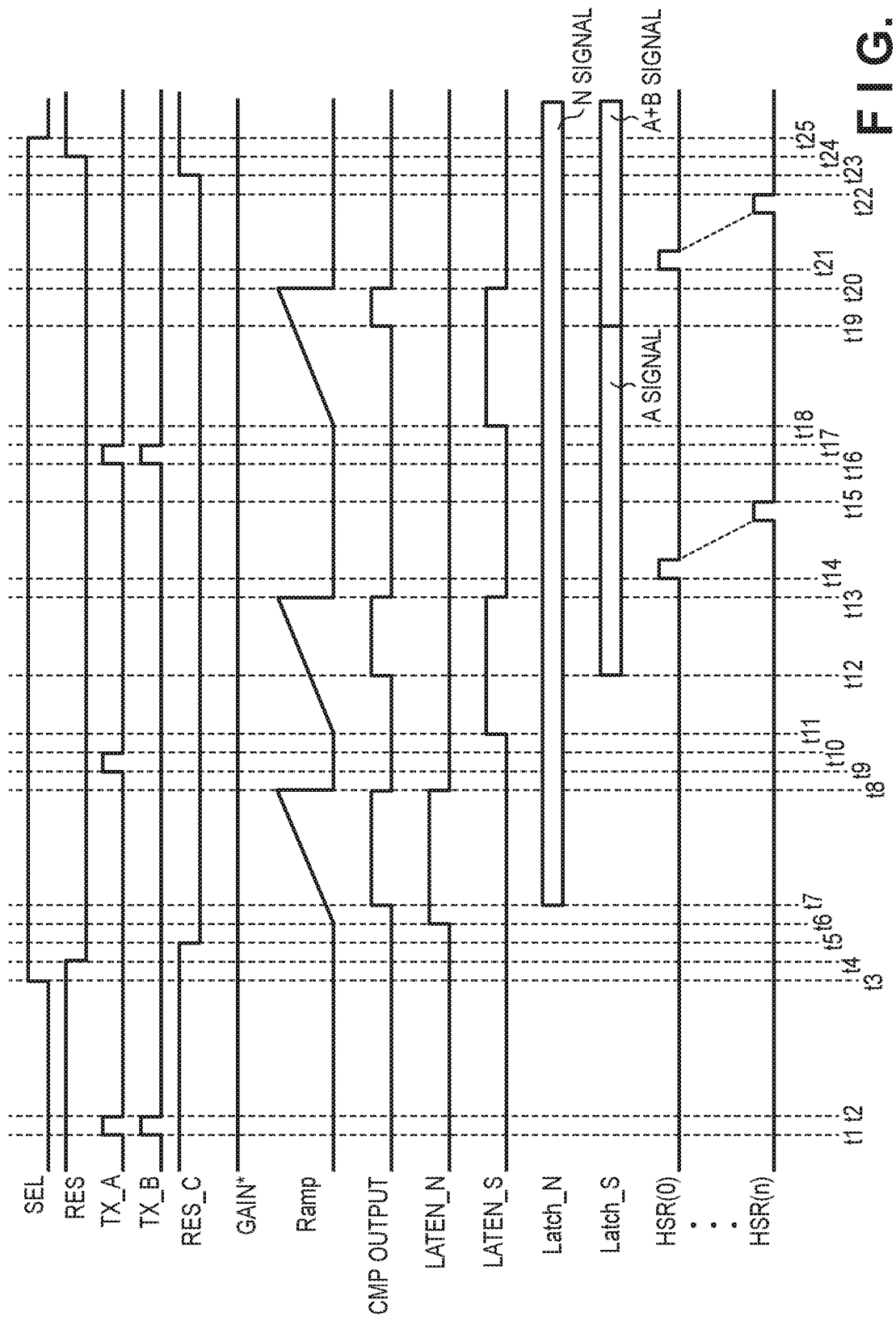
FIG. 4 is a timing chart illustrating an example of operations by the image sensor illustrated in FIG. 3.

Readout operations carried out for one row's worth of pixels will be described with reference to FIG. 4, which is a timing chart pertaining to the readout operations of the image sensor 14 illustrated in FIG. 3. Note that a control signal being at H means that the corresponding switch is on, and a control signal being at L means that the corresponding switch is off.

At time t1, the vertical scanning circuit 209 turns the transfer switches 202a and 202b on by changing the control signals TX_A and TX_B from L to H, with the control signal RES already at H. As a result, the charges accumulated in the photodiodes 201a and 201b are transferred to the power source 208 via the transfer switches 202a and 202b and the reset switch 205, and the photodiodes 201a and 201b are reset. The FD 203 is reset in the same manner. At time t2, the vertical scanning circuit 209 sets the control signals TX_A and TX_B to L to turn the transfer switches 202a and 202b off, whereupon the photodiodes 201a and 201 b begin accumulating photocharges.

Once a predetermined accumulation time has passed, at time t3, the vertical scanning circuit 209 sets the control signal SEL to H to turn the selection switch 206 on. As a result, the source of the amplifying unit 204 is connected to the vertical output line 207. At time t4, the vertical scanning circuit 209 sets the control signal RES to L to turn the reset switch 205 off. As a result, the resetting of the FD 203 is canceled, and the reset signal level of the FD 203 is read out to the vertical output line 207 via the amplifying unit 204 and input to the readout circuit 235.

Then, at time t5, the timing generation circuit 18 sets the control signal RES_C to L. As a result, the switch 217 turns on, and a voltage based on the difference between the reset signal level read out to the vertical output line 207 and the reference voltage Vref is output from the op-amp 213. The system control unit 50 has set one of the control signals GAIN0 to GAIN2 to H in the image sensor 14 in advance on the basis of an ISO sensitivity set through the operation unit 70. For example, if the camera 100 according to the embodiment can be set to an ISO sensitivity of 100, 200, or 400, the control signal GAIN0 is H, and GAIN1 and GAIN2 are L, when the ISO sensitivity is 100. Likewise, the control signal GAIN1 is H when the ISO sensitivity is 200, and the control signal GAIN2 is H when the ISO sensitivity is 400. Note that the types of sensitivity settings and the relationships between the sensitivity settings and the control signals are not limited to those described here.

The op-amp 213 amplifies the input voltage at an inverting gain determined by a capacitance ratio between the clamp capacitance 211 and one of the feedback capacitances 214 to 216 which corresponds to the switch corresponding to the control signals GAIN0 to GAIN2 that are at H. The amplified voltage is then output. A random noise component produced by the circuitry up to the op-amp 213 is also amplified as a result of this amplification. The strength of the random noise present in the amplified signal therefore depends on the ISO sensitivity.

Next, at time t6, the ramp signal generator 230 begins outputting the ramp signal, in which the signal level rises linearly as time passes. At the same time, the counter 231 begins counting up from the reset state. The timing generation circuit 18 sets LATEN_N to H to activate Latch_N. The comparator 221 compares the signal output from the op-amp 213 with the ramp signal output by the ramp signal generator 230. Once the ramp signal level rises above the output signal level of the op-amp 213, the output of the comparator 221 changes from L to H (time t7). When the output of the comparator 221 changes from L to H while the Latch_N 222 has LATEN_N at H, the counter value output by the counter 231 at that point in time is stored. The counter value stored by Latch_N 222 corresponds to a digital value expressing the N signal level (N signal data). Note that LATEN_S is at L, and thus the Latch_S 223 is inactive and does not store the count value. Then, when the ramp signal level reaches a predetermined value at time t8, the ramp signal generator 230 stops outputting the ramp signal. The timing generation circuit also sets LATEN_N to L.

At time t9, the vertical scanning circuit 209 sets the control signal TX_A to H. As a result, the transfer switch 202a turns on, and the photocharge accumulated in the photodiode 201a from time t2 (the A signal) is transferred to the FD 203. Then, at time t10, the vertical scanning circuit 209 sets the control signal TX_A to L. The FD 203 converts the transferred charge to a potential, and this potential (the A signal level) is then output to the readout circuit 235 via the amplifying unit 204 and the vertical output line 207. The op-amp 213 outputs a voltage based on the difference between the A signal level read out to the vertical output line 207 and the reference voltage Vref. The inverting gain of the op-amp 213 is determined by the ratio between the clamp capacitance 211 and one of the feedback capacitances 214 to 216.

Next, at time t11, the ramp signal generator 230 begins outputting the ramp signal, and at the same time, the counter 231 begins counting up from the reset state. The timing generation circuit 18 sets LATEN_S to H to activate Latch_S. The comparator 221 compares the signal output from the op-amp 213 with the ramp signal output by the ramp signal generator 230. Once the ramp signal level rises above the output signal level of the op-amp 213, the output of the comparator 221 changes from L to H (time t12). When the output of the comparator 221 changes from L to H while the Latch_S 223 has LATEN_S at H, the counter value output by the counter 231 at that point in time is stored. The counter value stored by Latch_S 223 corresponds to a digital value expressing the A signal level (A signal data). Note that LATEN_N is at L, and thus the Latch_N 222 is inactive and does not store the count value. Then, when the ramp signal level reaches a predetermined value at time t13, the ramp signal generator 230 stops outputting the ramp signal. The timing generation circuit also sets LATEN_S to L.

Then, from time t14 to t15, the horizontal scanning circuit 232 sets the control signals hsr(h) to H in sequence, for set periods of time. As a result, the switches 226 and 227 of each readout circuit 235 turn on for the set period of time and then return to off. The N signal data and A signal data held in Latch_N 222 and Latch_S 223 of each readout circuit 235 are read out to the common output lines 228 and 229, respectively, and input to the data output unit 233. For the A signal data and the N signal data output from each readout circuit 235, the data output unit 233 outputs a value obtained by subtracting the N signal data from the A signal data to the exterior.

From time t16 to t17, the vertical scanning circuit 209 sets the control signals TX_A and TX_B to H to turn the transfer switches 202a and 202b on. As a result, the photocharges from both the photodiodes 201a and 201b are transferred to the FD 203. The FD 203 converts the transferred charges to a potential, and this potential (the A+B signal level) is then output to the readout circuit 235 via the amplifying unit 204 and the vertical output line 207. The op-amp 213 outputs a voltage based on the difference between the A+B signal level read out to the vertical output line 207 and the reference voltage Vref.

Next, at time t18, the ramp signal generator 230 begins outputting the ramp signal, and at the same time, the counter 231 begins counting up from the reset state. The timing generation circuit 18 sets LATEN_S to H to activate Latch_S. The comparator 221 compares the signal output from the op-amp 213 with the ramp signal output by the ramp signal generator 230. Once the ramp signal level rises above the output signal level of the op-amp 213, the output of the comparator 221 changes from L to H (time t19). When the output of the comparator 221 changes from L to H while the Latch_S 223 has LATEN_S at H, the counter value output by the counter 231 at that point in time is stored. The counter value stored by Latch_S 223 corresponds to a digital value expressing the A+B signal level (A+B signal data). Then, when the ramp signal level reaches a predetermined value at time t20, the ramp signal generator 230 stops outputting the ramp signal. The timing generation circuit also sets LATEN_S to L.

Then, from time t21 to t22, the horizontal scanning circuit 232 sets the control signals hsr(h) to H in sequence, for set periods of time. As a result, the switches 226 and 227 of each readout circuit 235 turn on for the set period of time and then return to off. The N signal data and A+B signal data held in Latch_N 222 and Latch_S 223 of each readout circuit 235 are read out to the common output lines 228 and 229, respectively, and input to the data output unit 233. For the A+B signal data and the N signal data output from each readout circuit 235, the data output unit 233 outputs a value obtained by subtracting the N signal data from the A+B signal data to the exterior.

At time t22, the timing generation circuit 18 sets the control signal RES_C to H; at time t23, the vertical scanning circuit 209 sets the control signal RES to H; and at time t24, the vertical scanning circuit 209 sets the control signal SEL to L. The operations for reading out one row are completed as a result. One frame's worth of an image signal is obtained by repeating these operations for a predetermined number of rows. In this manner, the A signal and the A+B signal are read out in an alternating manner every predetermined number of units (here, every one row).

The camera 100 according to the present embodiment has a still image mode and a moving image mode. When the still image mode is set, the system control unit 50 sets the image sensor 14 to a total pixel readout mode and carries out control so that the pixel data is read out from all the rows. When the moving image mode is set, the system control unit 50 sets the image sensor 14 to a thinned readout mode, and carries out control so that the pixel data is read out at a cycle of every three rows, for example (i.e., one row is read out, and two rows are skipped). Thus in the present embodiment, fewer rows are read out in the moving image mode than in the still image mode. However, the readout methods used in the still image mode and the moving image mode are not limited thereto. In the moving image mode in particular, the readout may be thinned at the pixel level rather than at the row level.

In this manner, the A signal, which serves as a second viewpoint image from which reset noise has been removed, and the A+B signal, which serves as the first viewpoint image, can be read out from the image sensor 14 in a single instance of shooting (exposure) by the image sensor 14. The A signal is used as a signal for capturing an image or for focus detection, and the A+B signal is used as a signal constituting a shot image. The A+B signal and the A signal are also used to generate the B signal, which is used for capturing an image or for focus detection. The first viewpoint image (the A+B signal) and the second viewpoint image (the A signal) are multi-viewpoint images having the same charge accumulation period (equivalent charge accumulation timings).

Note that the image sensor 14 according to the present embodiment has two types of readout modes, namely the total pixel readout mode (a first readout mode) and the thinned readout mode (a second readout mode). The total pixel readout mode is a readout mode in which all the active pixels are read out, and is set when wishing to obtain a high-resolution still image, for example.

The thinned readout mode is a mode in which fewer pixels are read out than in the total pixel readout mode. The thinned readout mode is set when the required resolution is lower than that for high-resolution still images, when it is necessary to read images out at high speeds, and so on, as is the case for moving images, preview images, live view images, or the like, for example. The thinned readout may be carried out at the row level as described above, or the pixels may be thinned and read out at the same ratio in both the horizontal and vertical directions so as to avoid changing the aspect ratio of the image, for example. Note that "thinning" includes not only configurations where no readout is carried out, but also configurations where read-out signals are discarded (ignored), configurations where the number of signals is reduced by generating a single signal from a plurality of read-out signals, and so on. For example, the SN ratio can be improved by averaging the signals read out from a plurality of adjacent pixels to generate a single signal.

Figure 5A:
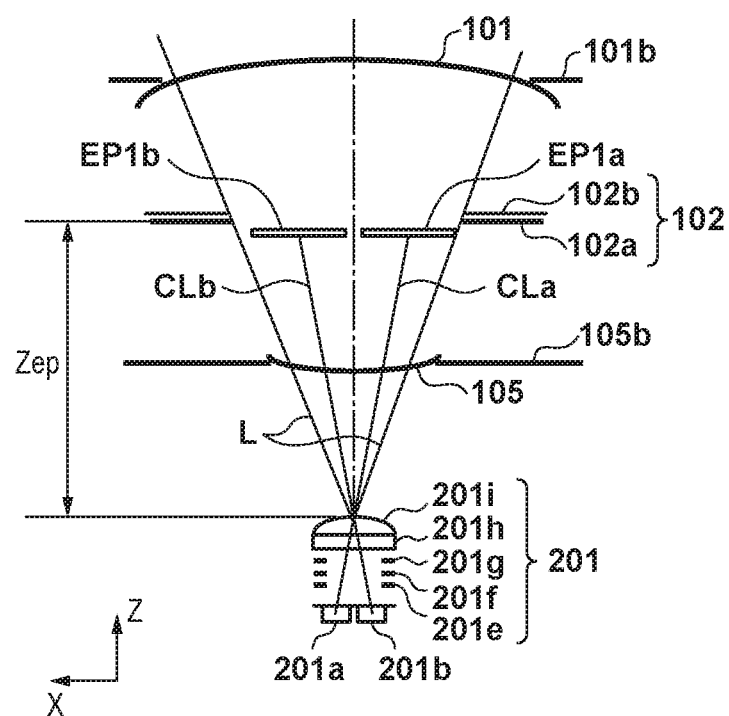
FIGS. 5A and 5B are diagrams illustrating an example of the relationship between photoelectric conversion regions and exit pupils according to an embodiment.

FIG. 5A is a diagram illustrating a conjugate relationship between an exit pupil surface of the shooting lens 300, and the photoelectric conversion units 201a and 201b in a pixel 200 disposed near the center of the imaging surface of the image sensor 14 (a central pixel), in the image capture apparatus according to the present embodiment. The photoelectric conversion units 201a and 201b in the image sensor 14 and the exit pupil surface of the shooting lens 300 are designed to be in a conjugate relationship due to the microlens 201i. The exit pupil surface of the shooting lens 300 typically coincides almost exactly with the surface where an iris-type aperture stop for adjusting the light amount is provided.

Figure 5B:
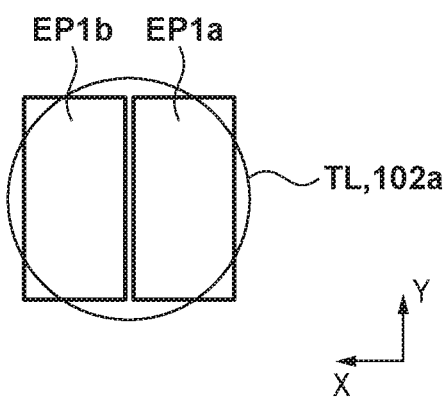

On the other hand, the shooting lens 300 according to the present embodiment is a zoom lens having a magnification function. With a zoom lens, performing an operation to change the magnification can also change the size of the exit pupil, the distance from the imaging surface to the exit pupil (the exit pupil distance), and so on. FIGS. 5A and 5B illustrate the focal length of the shooting lens 300 as being in the center, between a wide-angle end and a telephoto end. Taking an exit pupil distance DI in this state as a reference value, the shape of the microlens, eccentricity parameters based on the image height (the distance or XY coordinates from the center of the screen), and so on are designed to have optimal values.

As illustrated in FIG. 5A, the shooting lens 300 includes a first lens group 101, a lens barrel member 101b that holds the first lens group, a third lens group 105, and a lens barrel member 105b that holds the third lens group. The shooting lens 300 also includes an aperture stop 102, an opening plate 102a that defines the diameter of the opening when the aperture is fully open, and aperture blades 102b for adjusting the diameter of the opening when reducing the aperture. In FIGS. 5A and 5B, 101b, 102a, 102b, and 105b, which act as members for limiting light beams passing through the shooting lens 300, indicate an optical virtual image when observed from the imaging surface. A combined opening near the aperture stop 102 defines the exit pupil of the shooting lens 300, and the distance thereof from the imaging surface is the exit pupil distance DI.

The photoelectric conversion units 201a and 201b are disposed in the lowermost layer of the pixel 200. Wiring layers 201e to 201g, a color filter 201h, and the microlens 201i are provided in the layers above the photoelectric conversion units 201a and 201b. The photoelectric conversion units 201a and 201 b are projected onto the exit pupil surface of the shooting lens 300 by the microlens 201i. In other words, the exit pupil is projected onto the surfaces of the photoelectric conversion units 201a and 201b through the microlens 201i.

FIG. 5B illustrates projection images EP1a and EP1b of the photoelectric conversion units 201a and 201 b, projected onto the exit pupil surface of the shooting lens 300. A circle TL indicates the maximum range of light beams incident on the pixel 200, defined by the opening plate 102a of the aperture stop 102, over the exit pupil surface. The circle TL is defined by the opening plate 102a, and thus the circle TL is also indicated by "102a" in the diagram. Because FIGS. 5A and 5B indicate the central pixel, vignetting of the light beam is symmetrical relative to the optical axis, with the photoelectric conversion units 201a and 201b receiving light beams through pupil regions having the same size. Most of the projection images EP1a and EP1b fall within the circle TL, and the light beams therefore experience almost no vignetting. As such, when signals obtained from photoelectric conversion by the photoelectric conversion units 201a and 201b are added, the result is obtained from photoelectrically converting the light beams passing through almost all of the circle TL, i.e., the exit pupil region. The region of the exit pupil where the photoelectric conversion unit 201a receives light will be called a "first pupil region", the region of the exit pupil where the photoelectric conversion unit 201b receives light will be called a "second pupil region", and a region obtained by combining the first pupil region and the second pupil region will be called a "third pupil region".

Still Image Continuous Shooting Process Carried Out in Parallel with Live View Display Operations of the camera 100 when performing still image continuous shooting in parallel with a live view display (called "live view continuous shooting (LV continuous shooting)" hereinafter) will be described next. It is necessary to repeatedly perform the following processing during live view continuous shooting:

read out all pixels to obtain a still image
carry out thinned readout to obtain an image for live view display and for focus detection
image correction and development processing to the still image
correction processing to focus detection
focus detection processing
focus adjustment processing
live view image display processing
still image storage processing These will be described in order hereinafter.

The processing pertaining to readout from the image sensor 14 will be described first. Readout in the total pixel readout mode, reset operations, readout in the thinned readout mode, and reset operations are performed repeatedly for the image sensor 14. Note that the reset operations are operations for resetting the charges accumulated in the pixels of the image sensor 14, and are performed before switching the readout mode.

When image data for live view display is used in phase difference-based focus detection, in the thinning readout, the A+B signal is read out along with the A signal or the B signal, or both the A signal and the B signal are read out. In the case of the former, the AF signal generation circuit 20b generates the B signal (or the A signal) by subtracting the A signal (or the B signal) from the A+B signal, and then generates a pair of image signals for AF. In the case of the latter, the first correction processing circuit 20a adds the A signal and the B signal to generate the A+B signal, and then applies the correction processing. Note that unless otherwise noted, the addition and subtraction of the A signal, the B signal, and the A+B signal are carried out among signals read out from the same pixel. It is acceptable to read out only the A+B signal for pixels that do not have a focus detection region.

Image Correction and Development Processing

The image correction processing is applied to the image data before the development processing, and includes, but is not limited to, offset correction, gain correction, dark shading correction, color shading correction, correcting drops in the peripheral light amount, and so on, for example. All of these correction processes can be carried out using known techniques, and are not limited to the methods described below. The offset correction and gain correction are processes for correcting the influence that a difference between the input/output characteristics of the AD converter in the readout circuit 235 and ideal input/output characteristics has on the value of the image data. A correction processing circuit can, for example, read out an offset correction value and a gain correction value, which are based on the values of the pre-correction image data, from the non-volatile memory 56, and then perform the offset correction and gain correction by applying those values to the image data values.

The dark shading correction is a process for correcting variations in the signal levels from pixel to pixel, which are produced by the characteristics of the image sensor, the influence of wiring, and so on.

The color shading correction is a process for correcting color unevenness caused by the sensitivity of the image sensor to specific colors differing from region to region. The degree to which this color unevenness arises depends on the type of the ambient light, and is therefore corrected using correction values based on the color temperature of the light source (gain correction amounts for R, G, and B sensitivities), which are stored in the non-volatile memory 56 in advance, for example.

Correcting drops in the peripheral light amount reduces a phenomenon in which the four corners of the screen become darker, by applying correction values based on the shooting lens, the shooting conditions, and the image height (the point of intersection between the optical axis and the center of the image) to the image data.

The image correction process for focus detection is a process for correcting the focus detection signals (the A image signal and the B image signal) generated from the image data read out from the image sensor, before those signals are used in the focus detection process. This may include, but is not limited to, gain correction, dark shading correction, shading correction, correcting drops in the peripheral light amount, and so on. As will be described later, the focus detection process uses the luminance (Y) signal but does not require color information, and thus the per-pixel offset correction and color shading correction are not applied.

The gain correction, the dark shading correction, the shading correction, and the correction of drops in the peripheral light amount are the same as those described above, and will therefore not be described. However, the shading correction process will be described here. "Shading" refers to unevenness in the intensities of the image signals. When a light beam is partially blocked by the shooting optical system (including optical members such as the lenses and aperture stop, the lens barrel holding those members, and so on), the image signal level drops in at least one of the A image signal and the B image signal, which can produce shading. A drop in the image signal level and shading can cause a drop in the accuracy at which the phase difference between the A image signal and the B image signal is detected, and by extension, a drop in the focus detection accuracy.

Shading varies depending on the exit pupil distance, the aperture value, and the image height. As such, for the shading correction process, correction values are stored for combinations of discrete values for these three parameters, while correction values for combination of other values are found through interpolation.

As described with reference to FIG. 1B, the image processing circuit 20 of the present embodiment includes the first correction processing circuit 20a which applies correction processing for still images, and the second correction processing circuit 20d which applies correction processing for focus detection. The correction processes can be executed in parallel. Real-time correction processing can be performed by starting the correction processing at the same time as the start of the readout of an image signal from the image sensor 14.

Although the still image correction process and the focus detection correction process can be performed in parallel by the first and second correction processing circuits 20a and 20d, both the correction process for the live view image and the correction process for the still image are carried out by the first correction processing circuit 20a, and thus cannot be carried out in parallel.

The development process by the development processing circuit 20c will be described next. "Development process" is a general term for a plurality of processes including white balance adjustment and demosaicing. Although there is no strict definition, the process involves converting image data having one color component per pixel read out from the image sensor into image data in a standard format.

White balance adjustment is a process for adjusting gain values applied to color components so that the color components (e.g., R, G, and B) of pixels having values included in a predetermined white region take on the same value. Demosaicing is a process of interpolating color component values that are missing for each piece of pixel data. A typical single-panel color image sensor is provided with color filters in which a plurality of colors are arranged in a mosaic pattern, and the read-out image data has only one color component value for each pixel. Demosaicing interpolates the missing color component values for each pixel using the values of the other pixels. Color image data is obtained from the demosaicing.

A process for improving the image quality can be applied to the color image data as part of the development processing. Examples include, but are not limited to, processing such as noise reduction, saturation enhancement, hue correction, edge enhancement, and so on. Furthermore, processing (e.g., encoding processing) for converting image data into a predetermined format (e.g., JPEG or TIFF) can be applied as well.

Focus Detection and Focus Adjustment Processing

Focus detection processing performed by the AF unit 42 and focus adjustment processing performed by the system control unit 50 will be described next. As described above, in the focus detection processing, the AF unit 42 detects a phase difference between the pair of image signals (the A image signal and the B image signal) generated by the AF signal generation circuit 20b, and converts that phase difference into a defocus amount and a defocus direction. Although the AF signal generation circuit 20b is described as generating the pair of image signals from image data read out for live view display, the pair of image signals may be generated from the image data read out for use as a still image. The focus adjustment process is a process in which the system control unit 50 drives the focus lens of the lens 311 based on the defocus amount and the defocus direction detected by the AF unit 42.

Live View Display Processing

The live view display processing is processing in which the system control unit 50 displays, in the image display unit 28, image data for display, which has been subjected to the image correction processing and development processing for still images on the basis of the image data read out from the image sensor 14 in the thinning readout.

Still Image Storage Processing

In the still image storage processing, the memory control unit 22 temporarily stores, in the image memory 30a, the image data obtained by reading out all pixels from the image sensor for use as a still image. The image processing circuit 20 applies the above-described still image correction processing and development processing to the image data stored in the image memory 30a, and writes the resulting image data back into the image memory 30a.

The foregoing are the processes performed during live view continuous shooting. In the present embodiment, the continuous shooting speed is improved by improving the procedure for performing these processes.

FIGS. 6A to 6F are time charts showing examples of processing sequences carried out during live view continuous shooting. For the sake of simplicity, FIGS. 6A to 6F illustrate the processing sequences from the start of charge accumulation for shooting the first still image to the charge accumulation for shooting the second still image shooting. However, the same processing sequence is performed repeatedly thereafter.

Additionally, of the above-described processes, FIGS. 6A to 6F illustrate the timing of processing for accumulating and reading out charges in the image sensor, still image/live view (LV) image correction, focus detection/focus adjustment, live view display (EVF), and still image storage. The development process is not described here because it is performed almost in parallel with the still image correction process, and the time during which only the development process is performed is negligible relative to the time required for the other processes.

Figure 6A:
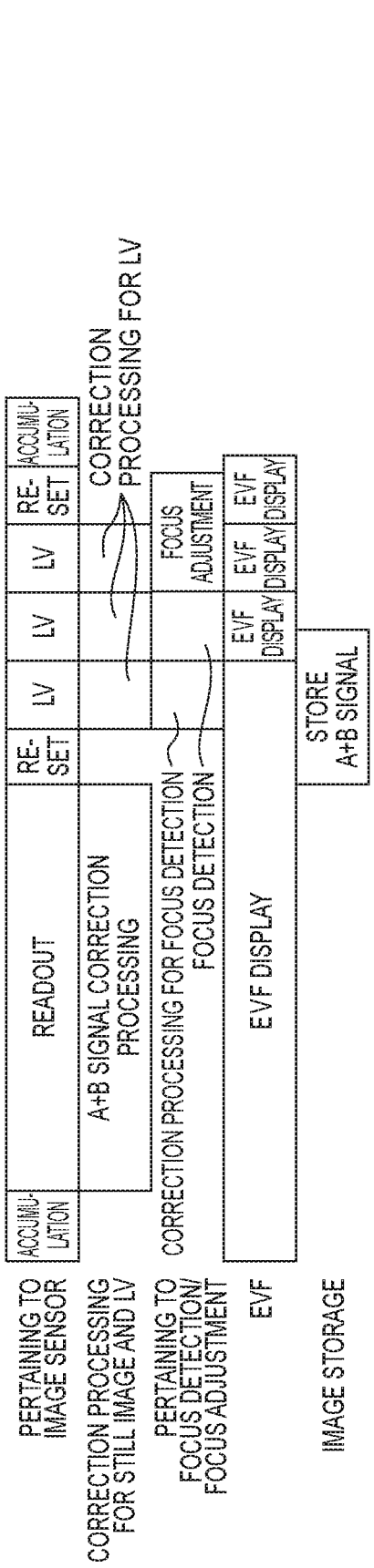

FIG. 6A illustrates a processing sequence carried out when a single viewpoint image (A+B signal) is continuously shot as a still image. The processes will be described hereinafter.

Processing Pertaining to the Image Sensor:

The system control unit 50 opens and closes the shutter 12 within the charge accumulation period of the image sensor 14 to expose the image sensor 14 for a period based on the shutter speed, which is determined by the AE process. The A+B signal is then read out from the image sensor 14, which is set to the total pixel readout mode. Once the readout ends, the system control unit 50 opens the shutter 12, resets the pixels in the image sensor 14, and furthermore switches the readout mode of the image sensor 14 to the thinned readout mode. Then, with the shutter 12 remaining open, the system control unit 50 then exposes and reads out the image sensor 14 on a line-by-line basis, and reads out image data for both live view (LV) display and AF. The system control unit 50 repeatedly obtains the image data for display and AF until the focus detection process using the read-out image data is complete and the focus adjustment processing is started. Once the focus adjustment process is started, the system control unit 50 resets the pixels in the image sensor 14, and furthermore closes the shutter 12 after switching the readout mode of the image sensor 14 back to the total pixel readout mode. As a result, the image sensor 14 enters the charge accumulation period for shooting the second still image.

Image Correction Processing:

When the readout of the A+B signal is started, the first correction processing circuit 20a starts a still image correction process on the image data of the read-out A+B signal. The correction process by the first correction processing circuit 20a starts once the still image correction process (and development process) ends and the readout of the image data for LV display and AF begins.

Focus Detection/Focus Adjustment Processing:

Once the readout of the image data for LV display and AF is started, the AF signal generation circuit 20b generates a pair of signal strings for focus detection. The second correction processing circuit 20d applies the correction processing to the pair of signal strings and supplies the resulting signal strings to the AF unit 42 via the system control unit 50. The AF unit 42 detects a phase difference between the pair of signal strings, and finds a defocus amount and defocus direction on the basis of the detected phase difference (focus detection). On the basis of the defocus amount and defocus direction, the system control unit 50 drives the focus lens of the lens 311 using the lens system control unit 346 and the focus control unit 342 (focus adjustment).

EVF Display Processing:

The live view display cannot be refreshed during the period from when the charge accumulation period for shooting a still image starts to at least when the development process is complete for LV display image data read out next. As such, the system control unit 50 continuously displays the most recent image data for display in the image display unit 28 during this period. Once the development process is complete for the image data for LV display read out next, the system control unit 50 refreshes the LV display using that image data. Then, until the next charge accumulation period is started, the system control unit 50 refreshes the LV display each time development process is completed for the image data for LV display.

Image Storage Processing:

The system control unit 50 sequentially stores the A+B signals for which the development process is complete in the image memory 30*a*.

Figure 6B:
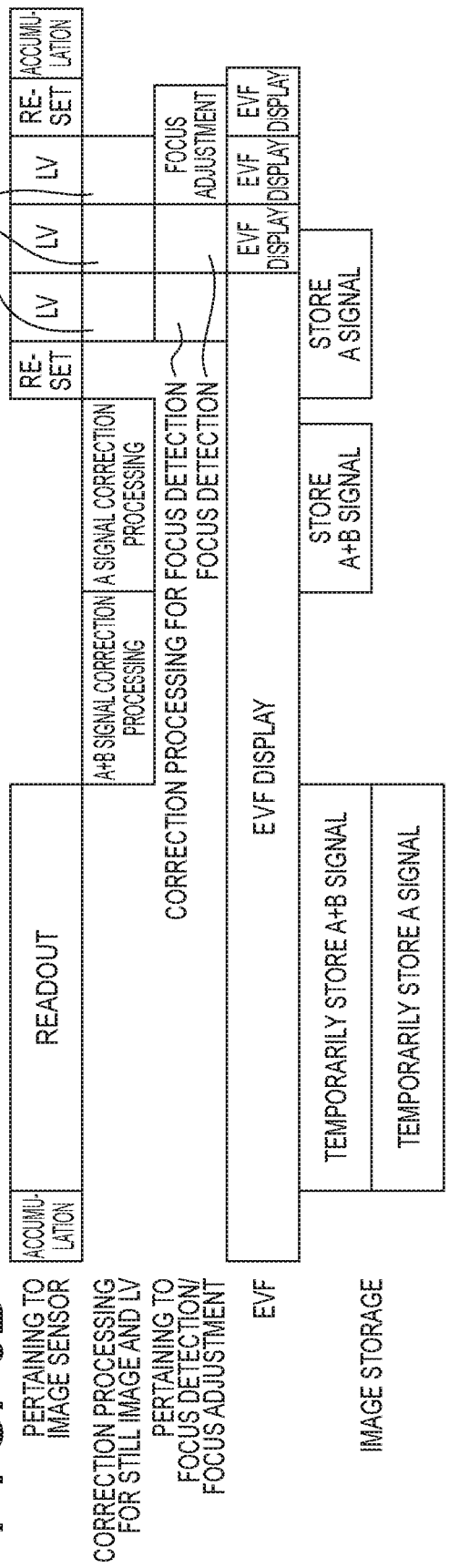

FIG. 6B illustrates a processing sequence for a case where both the first viewpoint image (the A+B signal) and the second viewpoint image (the A signal (or the B signal)) are continuously shot as still images. In this case, the A signal and the A+B signal are read out from the image sensor 14 on a row-by-row basis. In the processing sequence illustrated in FIG. 6B, the read-out signals are temporarily stored in the system memory 30*b*. Once the readout from the image sensor 14 is complete, the first correction processing circuit 20*a* starts the correction processing on the A+B signal. Once the correction processing is complete, the system control unit 50 stores the corrected A+B signal in the image memory 30*a*, and the first correction processing circuit 20*a* starts the correction processing on the A signal. Once the correction processing on the A signal is complete, the system control unit 50 stores the corrected A signal in the image memory 30*a*. As in FIG. 6A, the image data for LV display and AF is read out and subjected to the correction, focus detection, and focus adjustment processing. In the processing sequence illustrated in FIG. 6B, the correction processing for the A+B signals and the correction processing for the A signals are performed in sequence after all of the A+B signals and A signals are stored in the image memory 30*a*. As such, it takes longer for the image sensor 14 to enter the charge accumulation period for shooting the next still image. The continuous shooting interval increases as a result (i.e., the continuous shooting speed drops).

Figure 6C:
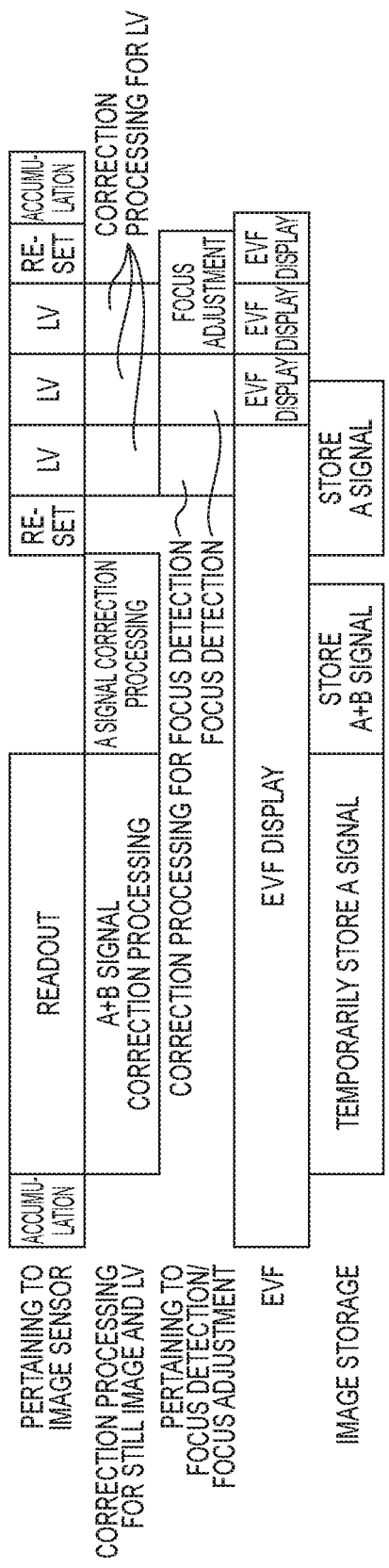

Accordingly, in the present embodiment, a drop in the continuous shooting speed in the processing sequence illustrated in FIG. 6B is suppressed by changing the processing sequence between the continuous shooting for the first viewpoint image and the continuous shooting for the second viewpoint image. FIG. 6C illustrates an example of a processing sequence for continuously shooting the first and second viewpoint images according to the present embodiment.

In the processing sequence illustrated in FIG. 6C, rather than starting the correction processing after storing all the A+B signals and A signals in the image memory 30*a*, the correction processing is applied in real time without storing the A+B signals in the image memory 30*a*. On the other hand, the A signals are stored in the system memory 30*b* until the correction processing is complete for the A+B signals. The correction processing is applied to the A signals once the correction processing for the A+B signals is complete. Carrying out the processing in real time makes the period occupied by the correction processing on the A+B signals by the first correction processing circuit 20*a* longer than when the correction processing is carried out after temporarily storing the A+B signals in the memory. However, carrying out the processing in real time makes it possible to complete the correction processing (and development processing) on the A+B signal at essentially the same time as when the readout of the image data from the image sensor 14 ends.

Thus according to the processing sequence illustrated in FIG. 6C, the readout of the image data and the correction processing on the A+B signals are performed in parallel, which makes it possible to shorten the continuous shooting interval compared to the sequence illustrated in FIG. 6B. The continuous shooting interval is of course longer than that in the sequence in FIG. 6A, however.

Figure 6D:
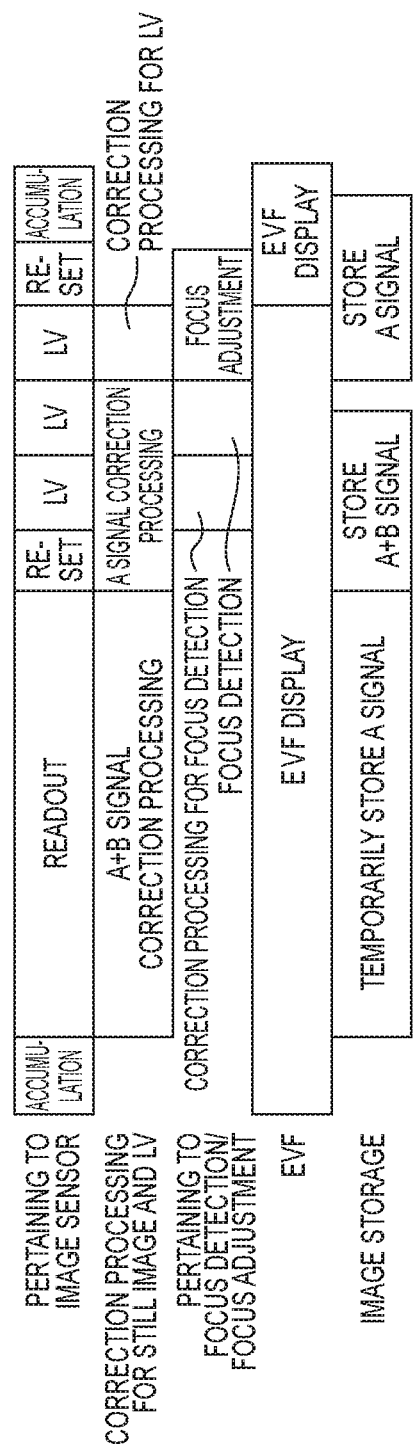

FIG. 6D illustrates a variation according to the present embodiment, in which the processing sequence illustrated in FIG. 6C has been changed so that the correction processing on the A signals is performed in parallel with the processing for exposing/reading out the image data for both LV and AF. This can also be described as starting the processing for exposing/reading out the image data for both LV and AF without waiting for the correction processing to be complete for the A signal, in the processing sequence illustrated in FIG. 6C. This makes it possible to shorten the continuous shooting interval to about the same interval as in continuous shooting for only one of the viewpoint images, as illustrated in FIG. 6A.

However, the correction processing for the LV image is not started until the correction processing is complete for the A signals, which causes the refresh rate of the EVF display to drop. This makes the LV display less smooth. That said, AF processing using LV images can be carried out without being affected by the correction processing for the A signals, and thus the focus detection and focus adjustment processes can be carried out at timings similar to those in the sequence illustrated in FIG. 6A.

FIG. 6E illustrates another variation according to the present embodiment, in which the processing sequence illustrated in FIG. 6D has been changed so that after the correction processing for the A+B signal is completed, the correction processing is carried out for the LV display images, and the correction processing is then carried out for the A signals. In the processing sequence illustrated in FIG. 6E, the LV display refresh rate is the same as in FIG. 6D. However, the refreshes occur earlier, which shortens the amount of time for which the previous image is continuously displayed and improves the smoothness of the display.

FIG. 6F is yet another variation according to the present embodiment, in which the processing sequence illustrated in FIG. 6E is changed in the following ways:

the A+B signals are subjected to the correction processing after being saved in the system memory 30*b* the correction processing on the A+B signals is started partway through the readout period the correction processing on the A signals is started partway through the next readout period In the processing sequence illustrated in FIG. 6F, the correction processing for the image data for LV display is not delayed by the correction processing on the still image data for recording, i.e., the A signals and the A+B signals. As such, the LV display refresh rate can be increased as compared to the processing sequences in FIGS. 6D and 6E, which makes it possible to further improve the smoothness of the LV display. The timing at which the correction processing on the A+B signals is started is set in advance so as not to overlap with the correction processing on the A signals.

The processing sequence illustrated in FIG. 6F can improve the smoothness of the LV display while suppressing a drop in the continuous shooting speed. However, it is necessary to perform the processing for correcting and storing the A signals involved in the final shooting after the continuous shooting ends. Note that in the processing sequence illustrated in FIG. 6F, all the A signals involved in the continuous shooting may be saved temporarily during the continuous shooting, and the correction and storage processing may then be carried out altogether after the continuous shooting ends.

The processing sequences according to the embodiment illustrated in FIGS. 6C to 6F assume that for still images, all of the pixels are exposed simultaneously using the (mechanical) shutter 12. However, the still images may be exposed and read out at the row level, in the same manner as the images for LV display (for AF). In this case, the image data read out for still images can be used for focus detection, LV display, and so on.

When continuously shooting multi-viewpoint images (here, the A signal or B signal, and the A+B signal), the camera 100 according to the present embodiment can perform one of the processing sequences illustrated in FIGS. 6C to 6F in response to the shutter switch SW2 being turned on during live view display. When continuously shooting one viewpoint image (the A+B signal), the camera 100 can perform the processing sequence illustrated in FIG. 6A.

Whether to shoot continuously or take a single shot, and in the case of continuous shooting, whether to continuously shoot a multi-viewpoint image or a single viewpoint image, may be determined in accordance with user settings made by operating a menu screen, a mode selection dial, or the like.

When continuously shooting multi-viewpoint images, which of the processing sequences illustrated in FIGS. 6C to 6F to perform may be set to be fixed, or set to be switchable. For example, if the continuous shooting speed is to be prioritized, one of the sequences in FIGS. 6D to 6F can be carried out. If a preview of the last image shot after the continuous shooting is to be displayed, one of the sequences in FIGS. 6C to 6E may be carried out. Furthermore, if the LV display refresh rate is to be prioritized, the processing sequence illustrated in FIG. 6C or 6F may be carried out.

If the system memory 30b has a low capacity and only one of the multi-viewpoint images can be stored, one of the processing sequences illustrated in FIGS. 6C to 6E, in which the correction processing is carried out in real time, may be performed.

Shooting operations carried out by the camera 100 according to the present embodiment will be described next with reference to FIG. 7.

Figure 7:
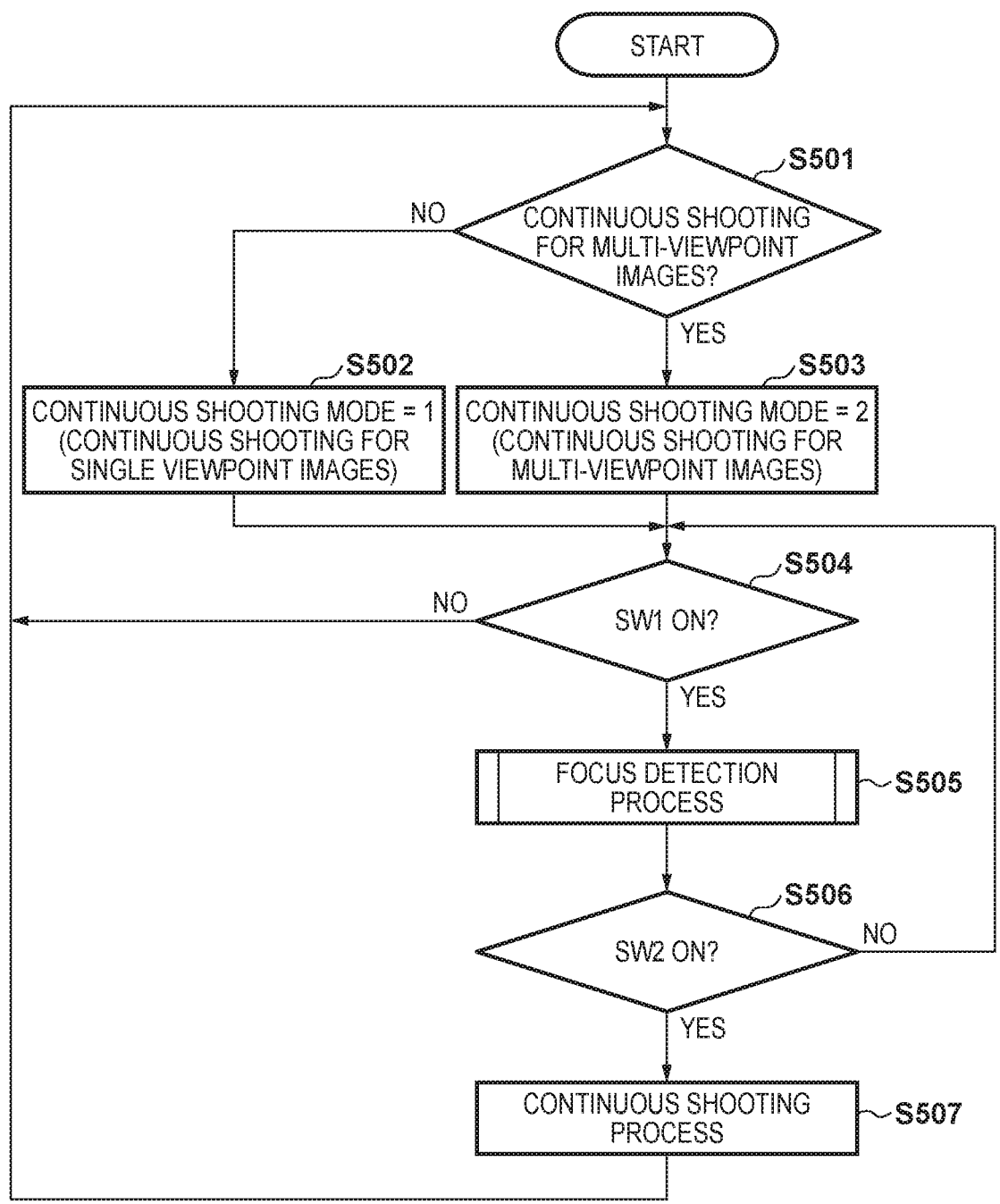
FIG. 7 is a flowchart pertaining to an image capturing process carried out by a camera according to an embodiment.

The flowchart in FIG. 7 can be carried out while in a still image shooting standby state, for example. It is assumed that in this state, the live view display and the processing pertaining thereto (moving image shooting, live view image generation, focus detection and focus adjustment processing for shooting a moving image, and so on) are performed continuously.

In step S501, the system control unit 50 determines whether to continuously shoot single viewpoint images or multi-viewpoint images on the basis of the current settings, for example. The process moves to step S502 if the system control unit 50 has determined to continuously shoot single viewpoint images, and to step S503 if the system control unit 50 has determined to continuously shoot multi-viewpoint images.

In step S502, the system control unit 50 selects continuous shooting for single viewpoint images (a first continuous shooting mode), whereas in step S503, the system control unit 50 selects continuous shooting for multi-viewpoint images (a second continuous shooting mode). The process then moves to step S504.

In step S504, the system control unit 50 determines whether or not the shutter switch SW1 is on. The process moves to step S505 if the switch is on, and returns to step S501 if the switch is off.

In step S505, the system control unit 50 carries out the focus detection process. Here, if only the A+B signal is being read out, the system control unit 50 changes the readout operations of the image sensor 14 so that the A signal or the B signal is read out as well. The system control unit 50 then instructs the AF signal generation circuit 20b to generate a pair of image signals, used for phase difference detection-based AF, from the image data, of the live view image, which is present in the focus detection region. The AF signal generation circuit 20b then supplies the generated image signals to the AF unit 42.

The AF unit 42 then calculates a correlation amount while varying the relative positions of the image signals, and detects the relative distance at which the correlation is highest as the phase difference. The AF unit 42 multiplies the detected phase difference by, for example, a predetermined defocus conversion coefficient, and finds the defocus amount and defocus direction. The defocus conversion coefficient can be found from the optical conditions at the time of the shooting (the aperture, exit pupil distance, lens frame information, and so on), the image height of the focus detection region, the sampling pitch of the signals constituting the A image and B image, and so on. The AF unit 42 notifies the system control unit 50 of the defocus amount and defocus direction. The system control unit 50 drives the focus lens of the lens 311 on the basis of the defocus amount and defocus direction.

In step S506, the system control unit 50 determines whether or not the shutter switch SW2 is on. The process moves to step S507 if the switch is on, and returns to step S504 if the switch is off.

In step S507, the system control unit 50 performs the processing sequence illustrated in FIG. 6A if the mode is the first continuous shooting mode, and one of the processing sequences illustrated in FIGS. 6C to 6F if the mode is the second continuous shooting mode, until SW2 turns off (or until an upper limit number for the continuous shooting is reached).

As described thus far, according to the present embodiment, in an image capture apparatus capable of continuously shooting multi-viewpoint images while displaying a live view; the correction processing to at least one of first and second viewpoint images is carried out in parallel with the readout of the first and second viewpoint images. This makes it possible to improve the continuous shooting speed as compared to a case where the correction processing is started after the readout of the first and second viewpoint images is completed. When the correction processing to one of the first and second viewpoint images is performed in parallel with the readout of the first and second viewpoint images, the smoothness of the live view display can be improved by reading out the image for live view display before starting the correction processing to the other viewpoint image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-215780, filed on Nov. 16, 2018, which is hereby incorporated by reference herein in its entirety.

What is claimed is:

1. An image capture apparatus comprising:
   an image sensor, from which a first viewpoint image and a second viewpoint image that share the same charge accumulation period can be read out;
   a correction circuit that applies correction processing to an image read out from the image sensor; and
   one or more processors that execute a program stored in a memory and function as:
   a control unit configured to control the image sensor and the correction circuit so that correction processing performed on the second viewpoint image corresponding to a first charge accumulation period by the correction circuit during continuous shooting is performed in parallel with the readout of the first viewpoint image corresponding to a second charge accumulation period after the first accumulation period, and is not performed in parallel with the readout of the first viewpoint image corresponding to the first charge accumulation period from the image sensor.

2. The image capture apparatus according to claim 1, wherein the first viewpoint image and the second viewpoint image are read out in an alternating manner every predetermined units; and
   the control unit controls the correction circuit to apply the correction processing to the second viewpoint image stored in a memory.

3. The image capture apparatus according to claim 2, wherein the control unit controls the correction circuit to apply the correction processing without storing the first viewpoint image in a memory.

4. The image capture apparatus according to claim 3, wherein the control unit controls the image sensor and the correction circuit such that, after the correction processing to the first viewpoint image corresponding the first charge accumulation period is complete and before the correction processing to the second viewpoint image corresponding to the first charge accumulation period is not complete, an image for a live view display is read out from the image sensor, and then the correction processing is applied to the image for a live view display by the correction circuit.

5. The image capture apparatus according to claim 1, wherein the control unit controls the image sensor and the correction circuit such that an image for a live view display as the first viewpoint image corresponding to a second charge accumulation period is read out from the image sensor in parallel with the correction processing on the second viewpoint image corresponding the first charge accumulation period.

6. The image capture apparatus according to claim 5, wherein the control unit controls the image sensor and the correction circuit such that the correction processing to the second viewpoint image corresponding to a first charge accumulation period is complete before or after the correction processing is applied to the image for the live view display.

7. The image capture apparatus according to claim 2, wherein the control unit controls the correction circuit to apply the correction processing to the first viewpoint image stored in a memory.

8. The image capture apparatus according to claim 7, wherein the control unit controls the correction circuit to apply the correction processing to the second viewpoint image corresponding to a first charge accumulation period for a current shooting in continuous shooting in parallel with a readout from the image sensor of the first viewpoint image corresponding to a second charge accumulation period for a next shooting in the continuous shooting, or after the continuous shooting ends.

9. The image capture apparatus according to claim 7, wherein the control unit controls the image sensor and the correction circuit such that after the correction processing to the first viewpoint image corresponding to a first charge accumulation period is complete, an image for live view display is read out from the image sensor, and then the correction processing is applied to the image for live view display by the correction circuit.

10. The image capture apparatus according to claim 4, wherein the control unit switches a readout mode of the image sensor depending on whether the first viewpoint image and the second viewpoint image are read out from the image sensor or the image for the live view display is read out from the image sensor.

11. The image capture apparatus according to claim 4, wherein the image for the live view display is used in a focus detection process.

12. The image capture apparatus according to claim 1, wherein the image sensor includes pixels, each having a plurality of photoelectric conversion units, and the first viewpoint image and second viewpoint image are read out from different photoelectric conversion units.

13. A method of controlling an image capture apparatus, the apparatus including an image sensor, from which a first viewpoint image and a second viewpoint image that share the same charge accumulation periods can be read out, and a correction circuit that applies correction processing to an image read out from the image sensor, the method comprising:
   controlling the image sensor and the correction circuit so that correction processing performed on the second viewpoint image corresponding to a first charge accumulation period by the correction circuit during continuous shooting is performed in parallel with the readout of the first viewpoint image corresponding to a second charge accumulation period after the first accumulation period, and is not performed in parallel with the readout of the first viewpoint image corresponding to the first charge accumulation period from the image sensor.

14. A non-transitory computer-readable medium storing a program executable by a computer included in an image capture apparatus that comprises an image sensor, from which a first viewpoint image and a second viewpoint image that share the same charge accumulation periods can be read out, and a correction circuit that applies correction processing to an image read out from the image sensor, wherein the program causes the computer, when executed by the computer, to function as a control unit configured to control the image sensor and the correction circuit so that correction processing performed on the second viewpoint image corresponding to a first charge accumulation period by the correction circuit during continuous shooting is performed in parallel with the readout of the first viewpoint image corresponding to a second charge accumulation period after the first accumulation period, and is not performed in parallel with the readout of the first viewpoint image corresponding to the first charge accumulation period from the image sensor.

* * * * *